United States Patent
Iwasaki

[19]

[11] Patent Number: 5,887,204
[45] Date of Patent: Mar. 23, 1999

[54] CAMERA PHOTOMETRY DEVICE

[75] Inventor: Hiroyuki Iwasaki, Yokohama, Japan

[73] Assignee: Nikon Corporation, Tokyo, Japan

[21] Appl. No.: 986,094

[22] Filed: Dec. 5, 1997

Related U.S. Application Data

[63] Continuation-in-part of Ser. No. 802,546, Feb. 18, 1997, abandoned.

[30] Foreign Application Priority Data

Mar. 18, 1996 [JP] Japan ..................................... 8-60878
Dec. 10, 1996 [JP] Japan .................................. 8-330013

[51] Int. Cl.$^6$ ..................................................... G03B 7/08
[52] U.S. Cl. ............................................................. 396/234
[58] Field of Search .................................... 396/233, 234, 396/96, 99; 356/222; 348/229, 230, 297, 298, 299, 296

[56] References Cited

U.S. PATENT DOCUMENTS

| | | | |
|---|---|---|---|
| 3,584,961 | 6/1971 | Cason et al. .............................. | 356/213 |
| 4,281,897 | 8/1981 | Fletcher .................................... | 356/213 |
| 4,460,257 | 7/1984 | Ogasawara ................................. | 396/96 |
| 4,563,069 | 1/1986 | Sakai et al. .............................. | 396/262 |
| 4,657,368 | 4/1987 | Kawamura ............................... | 396/130 |
| 5,341,220 | 8/1994 | Juen ........................................ | 348/299 |
| 5,721,977 | 2/1998 | Yamawaki et al. .................... | 396/96 X |
| 5,768,540 | 6/1998 | Iwasaki ................................... | 396/234 |

FOREIGN PATENT DOCUMENTS

A-58-111022  7/1983  Japan .
A-58-132735  8/1983  Japan .

*Primary Examiner*—W. B. Perkey
*Attorney, Agent, or Firm*—Oliff & Berridge, PLC

[57] ABSTRACT

Proper exposure is obtained even when the mirror down time is short, which occurs, for example, during continuous photography. This is achieved, for example, by determining the accumulation time and gain for a subsequent round of photometry based on whether a photometry prohibiting signal interrupted the current round of photometry. Additionally, the photometry parameters that are used for photometry can be changed (or set) based on changes in the film feed mode of the camera. The camera can include a photometry circuit that performs photometry on an object field using an accumulating type of photometry element. An accumulation controller controls the start and finish of the accumulation of the photometry element. A feed mode setting device is capable of setting a film feed mode from among a plurality of film feed modes. The plurality of film feed modes includes at least a high-speed mode in which the photographic (time) interval (between photographs) is short and a low-speed mode in which the photographic (time) interval is long. A photometry parameter determining device such as, e.g., a programmed micro-processor, determines the photometry parameters to be used for photometry based on the output of the feed mode setting device. Alternatively, or in addition, the photometry parameters are changed (or set) based on the status of the power source. A camera including this feature would have a status determining device that detects the camera operability status, in particular, the status of the power source. The photometry parameter determining device then determines the photometry parameters to be used for photometry based on the output of the status determining device.

59 Claims, 19 Drawing Sheets

CAMERA PHOTOMETRY DEVICE

CROSS-REFERENCE TO RELATED APPLICATION

This is a Continuation-In-Part of U.S. patent application No. 08/802,546, filed Feb. 18, 1997, now abandoned.

INCORPORATION BY REFERENCE

The disclosures of the following priority applications are herein incorporated by reference: Japanese Patent Applications Nos. 8-60878, filed Mar. 18, 1996 and 8-330013, filed Dec. 10, 1996. The disclosure of U.S. patent application No. 08/802,546 also is herein incorporated by reference in its entirety.

BACKGROUND OF THE INVENTION

1. Field of the Invention

The present invention relates to photometry devices that measure the brightness of an object, and relates in particular to photometry devices used in automatic exposure control of a camera.

2. Description of Related Art

Japanese Laid-Open Patent Application No. 58-132735 (which corresponds to U.S. Pat. No. 4,563,069) discloses a photometry device that prohibits operation of the photometry system and the focus detection system at fixed intervals during photography and after photography. Specifically, the camera is equipped with a quick return mirror as is common, for example, in single reflex cameras. A signal is generated prohibiting photometry and focus detection, with the aim being to prevent light from reaching the photometry system and the focus detection system while the mirror is up, which occurs during release, and for predetermined time periods after the mirror is returned to the down position.

Japanese Laid-Open Patent Application No. 58-111022 (which corresponds to U.S. Pat. No. 4,657,368) discloses a single reflex camera that updates control before and after release. During continuous photography this device performs open aperture photometry before the initial release, and thereafter switches to stop-down photometry.

Because the photometry devices described above require accumulation operations to perform photometry when using an accumulating photometry element (such as, e.g., a CCD), it is necessary to continue to guide the luminous flux (i.e., light) to the photometry optical system during accumulation. However, the luminous flux may be obstructed in the course of accumulation, for example, in optical systems that have the mirror up, such as occurs during release in a single reflex camera. Even though some data was present, the data is not read, but rather is discarded, after accumulation has been interrupted. In either of the cases noted above, because the photometry data expected at the start of accumulation cannot be obtained, it is necessary to repeat the photometry operation immediately after the mirror has returned to the down position.

However, during continuous photography, the mirror may again start to go up immediately after it has gone down, and the repeated photometry operation again may become obstructed, and thus interrupted. In this case, it is not possible to perform sufficient photometry even once, and proper exposure becomes unobtainable.

In order to solve this problem, the device of U.S. Pat. No. 4,563,069 prevents erroneous photometry by prohibiting photometry while the mirror is up. However, no measures are disclosed for use when the mirror down time is short, such as occurs during continuous photography.

Although the device of U.S. Pat. No. 4,657,368 takes certain measures during continuous photography, there are no measures disclosed for use with a photometry system that uses an accumulating photometry element.

SUMMARY OF THE INVENTION

It is an object of the present invention to provide a photometry device having an accumulation type of photometry element that obtains an appropriate photometry value, in which there is little chance that the accumulation process for photometry will be interrupted, even when the mirror down time is short, such as occurs during continuous photography.

In order to achieve the above and other objects, one embodiment of the invention includes a photometry circuit that performs photometry on an object field using an accumulating photometry element. An accumulation time setting circuit sets an accumulation time for a subsequent round of photometry based on the output of the photometry circuit. An accumulation controller controls the starting and stopping of accumulation by the photometry element. A prohibit signal generator generates a photometry prohibiting signal that prohibits accumulation by the photometry element. A parameter determining circuit determines photometry parameters (e.g., the gain and the accumulation time) that are to be used for the subsequent round of photometry based on the output of the accumulation time setting circuit and the prohibit signal generator.

Preferably, when photometry accumulation is interrupted due to the occurrence of the photometry prohibiting signal, the parameter determining circuit changes the values of the photometry parameters, as compared to the values of the photometry parameters when the photometry accumulation was not interrupted. It is also preferred that the parameter determining circuit changes the photometry parameters when the photometry accumulation was interrupted only during the first round of photometry that occurs after the photometry prohibiting signal stops being generated.

The photometry circuit preferably has a first mode in which the accumulation time for photometry is long, and a second mode in which the accumulation time for photometry is short in comparison with the first mode. The parameter determining circuit selects the first mode or the second mode based on the signals of both the accumulation time setting circuit and the prohibit signal generator. In particular, the parameter determining circuit selects the second mode during the next round of accumulation when the accumulation during the prior round of photometry was interrupted due to the generation of the photometry prohibiting signal by the prohibit signal generator.

The first mode can be a low gain of the photometry circuit, and the second mode can be a high gain of the photometry circuit.

For example, the second mode can be selected for the next round of photometry when the first mode was used during the previous round of photometry and the length of the accumulation time for the next round is longer than a first value. The first mode can be selected for use in the next round of photometry when the second mode was used during the previous round of photometry and the length of the accumulation time for the next round is shorter than a second value that is different from the first value. The parameter determining circuit can change the first value to a third value when the prior round accumulation was interrupted due to the generation of the photometry prohibiting signal by the prohibit signal generator. The parameter determining circuit can change the second value to a fourth value when the accumulation was interrupted. Preferably, the parameter determining circuit changes the first value to the third value only during the first round of photometry that occurs after release of the photometry prohibiting signal when the prior round accumulation was interrupted. Additionally, it is preferred that the parameter determining circuit changes the second value to the fourth value only during the first round of photometry that occurs after release of the photometry prohibiting signal when the prior round accumulation was interrupted.

When the photometry device is provided in a single reflex camera that is equipped with a quick return mirror, the prohibit signal generator can generate the photometry prohibiting signal in synchronization with the operation of the quick return mirror.

The invention can increase the success rate of photometry after release of photometry prohibition by determining the photometry parameters to be used for the next round of photometry based on the outputs of the accumulation controller and the prohibit signal generator. The success rate of photometry is raised even further because the photometry parameters are updated based on whether the prior photometry operation was interrupted.

The photometry precision is increased because the subsequent rounds of photometry should not be interrupted, which enables the system to return to the use of photometry parameters that are less prone to imprecision (e.g., high signal to noise ratios).

According to a second aspect of the invention, the photometry parameters that are used for photometry are changed (or set) based on changes in the film feed mode of the camera. According to one embodiment, the camera includes a photometry circuit that performs photometry on an object field using an accumulating type of photometry element. An accumulation controller controls the start and finish of the accumulation of the photometry element. A feed mode setting device is capable of setting a film feed mode from among a plurality of film feed modes. The plurality of film feed modes includes at least a high-speed mode in which the photographic (time) interval (between photographs) is short and a low-speed mode in which the photographic (time) interval is long. A photometry parameter determining device such as, e.g., a programmed microprocessor, determines the photometry parameters to be used for photometry based on the output of the feed mode setting device.

According to a third aspect of the invention, the photometry parameters are changed (or set) based on the status of the power source. According to one embodiment, the camera includes a photometry circuit that performs photometry on an object field using an accumulating type of photometry element. An accumulation controller controls the start and finish of the accumulation of the photometry element. A status determining device detects the camera operability status, in particular, the status of the power source. A photometry parameter determining device determines the photometry parameters to be used for photometry based on the output of the status determining device.

In either of the second and third embodiments, the photometry circuit can include a first mode in which the accumulation time for photometry is long, and a second mode in which the accumulation time is short as compared to the first mode. The photometry parameter determining device can select between the first mode and the second mode based on signals from the accumulation controller and the feed mode setting device or the status determining device.

In either embodiment, the photometry circuit can include a first mode in which the accumulation speed for photometry is slow, and a second mode in which the accumulation speed is fast as compared to the first mode. The photometry parameter determining device can select between the first mode and the second mode based on signals from the accumulation controller and the feed mode setting device or the status determining device. For example, when the photometry circuit is capable of switching the output gain to at least two levels, high and low; the first mode is the low gain and the second mode is the high gain.

In either embodiment, the second mode can be selected for use during the next round of photometry when the first mode was used during the prior round of photometry and the length of the accumulation time set for the next round is longer than a first value. Additionally, the first mode can be selected for use during the next round of photometry when the second mode was used during the prior round of photometry and the length of the accumulation time set for the next round is shorter than a second value that is different from the first value.

According to the third aspect of the invention, the second mode can be selected for use during the next round of photometry when the first mode was used during the prior round of photometry and the power source voltage is higher than a first value. Additionally, the first mode can be selected for use during the next round of photometry when the second mode was used during the prior round of photometry and the power source voltage is lower than a second value that is different from the first value.

The photometry parameter determining device changes the first value to a third value when the setting of the feed mode setting device is the high-speed mode.

The photometry parameter determining device changes the second value to a fourth value when the setting of the feed mode setting device is the high-speed mode.

The third value preferably is equal to or less than the smallest mirror-down time of a quick return mirror of a single-reflex camera used with the photometry device.

The fourth value preferably is equal to or less than the smallest mirror-down time of a quick return mirror of a single-reflex camera used with the photometry device.

BRIEF DESCRIPTION OF THE DRAWINGS

The invention will be described in conjunction with the following drawings which like reference numerals designate like elements and wherein.

DETAILED DESCRIPTION OF PREFERRED EMBODIMENTS

Preferred embodiments of the present invention are described below with reference to the drawings.

Figure 1:
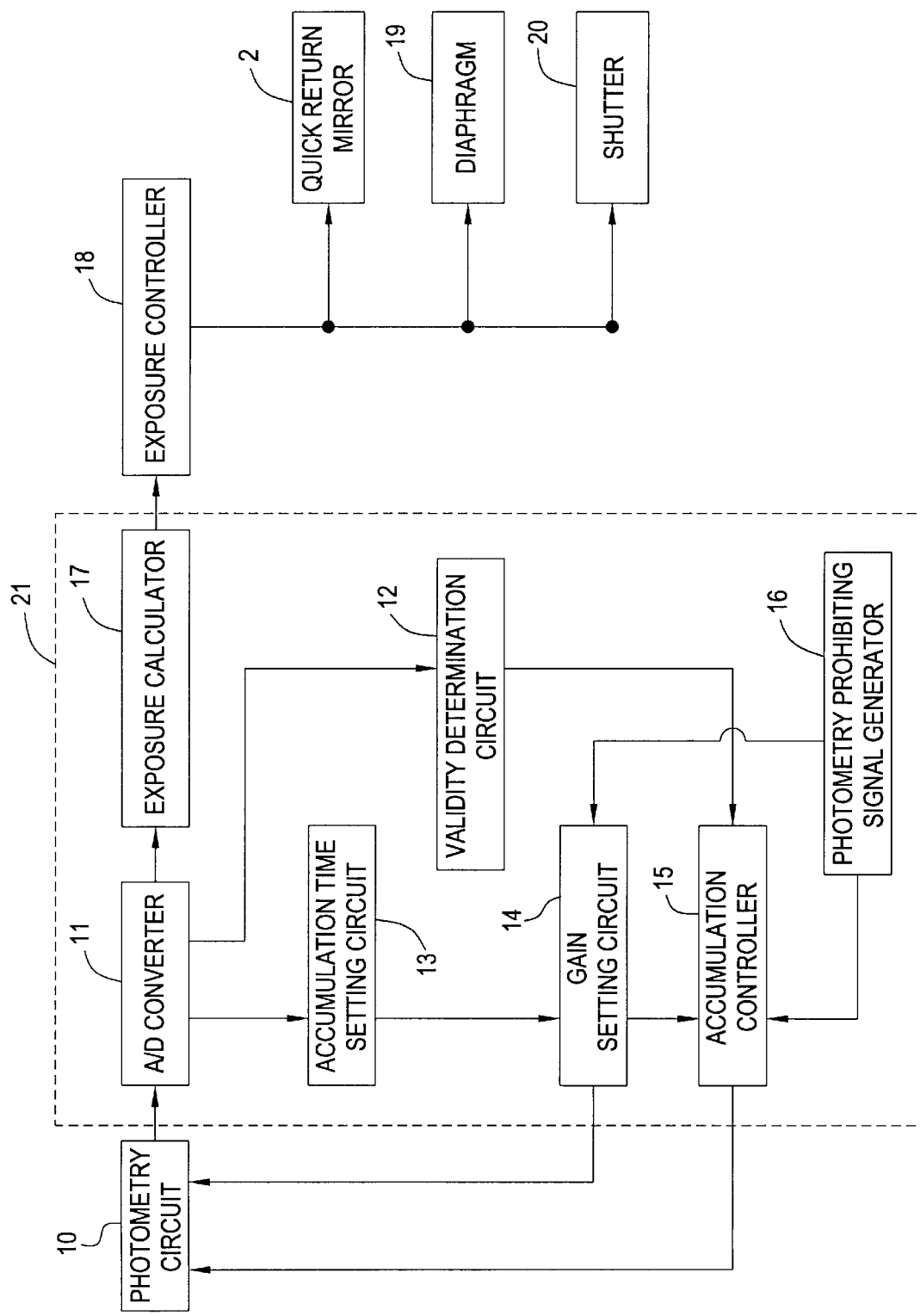
FIG. 1 is a block diagram of a camera equipped with a photometry device according to a first embodiment of the present invention.

FIG. 1 is a block diagram showing the general construction of a photometry device for a camera according to one preferred embodiment of the present invention. A photometry circuit 10 performs photometry on an object field using an accumulating photometry element such as, for example, a CCD (Charge-Coupled Device). Photometry circuit 10 starts and stops accumulation according to control signals supplied from the accumulation controller 15, and its output is input to an A/D converter 11. The output amperage of the photometry circuit 10 can be switched between an H gain state in which a high output is obtained, and an L gain state in which a low output is obtained.

The A/D converter 11 performs the conversion of the output of the photometry circuit 10 to numeric values, which are output therefrom as photometry data. The photometry data of the A/D converter is input into a validity determination circuit 12, an accumulation time setting circuit 13, and an exposure calculator 17.

The validity determination circuit 12 determines whether the obtained photometry data that has been acquired is within a proper range of values. When it has been determined that the photometry data is within the proper range of values, the data is considered valid, and computation of the appropriate exposure values is performed by the exposure calculator 17. When it has been determined that the photometry data is not within the proper range of values, the photometry process is basically started over. The method of this validity determination is explained in more detail below.

The accumulation time setting circuit 13 computes the accumulation time for use during the next round of photometry using the photometry data output by the A/D converter 11. The output of the accumulation time setting circuit 13 is input to the gain setting circuit 14. The gain setting circuit 14 determines the gain to be used by the photometry circuit 10 during the next round of photometry based on the output of the accumulation time setting circuit 13. The output of the gain setting circuit 14 is input to the accumulation controller 15. Some methods of accumulation time computation and gain setting are explained in more detail below.

A photometry prohibiting signal generator 16 generates signals linked with the mirror being up, which occurs, for example, during release of a single reflex camera. More specifically, photometry prohibiting signal generator 16 generates a photometry prohibiting signal in advance of the mirror moving up, and releases the photometry prohibiting signal after the mirror has stopped moving down. The output of the photometry prohibiting signal generator 16 is input to the gain setting circuit 14 and to the accumulation controller 15.

The accumulation controller 15 controls the accumulation time of the photometry circuit 10. When accumulation controller 15 receives the photometry prohibiting signal from the photometry prohibiting signal generator 16, it immediately interrupts accumulation and reads-in the data from the photometry circuit 10, which would be in the midst of accumulation. When the photometry prohibiting signal is input during accumulation, and it is determined that the accumulation has been interrupted mid-course, the gain setting circuit 14 performs gain switching only for use during the next round of photometry.

The exposure calculator 17 computes the proper exposure values based on the photometry data supplied from the A/D converter 11.

The exposure controller 18 springs up the mirror 2 when it detects that the photographer has pressed the release button. Exposure controller 18 also controls a diaphragm 19 and a shutter 20 of the camera so as to perform proper exposure according to the output of the exposure calculator 17.

In the present embodiment, the A/D converter 11, the validity determination circuit 12, the accumulation time setting circuit 13, the gain setting circuit 14, the accumulation controller 15, the photometry prohibiting signal generator 16, and the exposure calculator 17 all are realized by a single-chip microcomputer (hereafter microcomputer) 21. It is, however, within the scope of the invention to perform the functions of these components by other means. For example, the invention can be implemented using a plurality of separate dedicated or programmable integrated or other electronic circuits or devices (e.g., hardwired electronic or logic circuits such as discrete element circuits, or programmable logic devices such as PLDs, PLAs, PALs, or the like). A suitably programmed general purpose computer, e.g., a microprocessor, microcontroller or other processor device (CPU or MPU), either alone or in conjunction with one or more peripheral (e.g., integrated circuit) data and signal processing devices can be used to implement the invention. In general, any device or assembly of devices on which a finite state machine capable of implementing the flow charts shown in the figures can be used as a controller with the invention.

Figure 2:
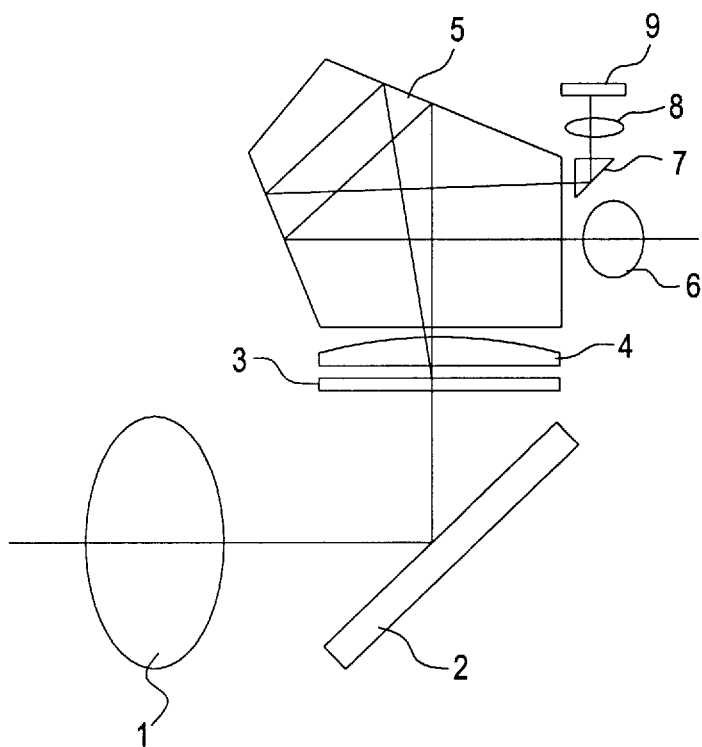
FIG. 2 is a schematic diagram showing the optical system of a camera according to the first embodiment.

FIG. 2 is a block diagram showing the optical system of a camera according to the present preferred embodiment. After the luminous flux has penetrated the photographic lens 1, it reaches the eyes of the photographer by reflecting from a quick-release mirror 2 and by passing through a diffusion screen 3, a condenser lens 4, a pentaprism 5, and an eyepiece lens 6. Meanwhile, after a part of the luminous flux has been diffused by the diffusion screen 3, it reaches a photometry element 9 (of the photometry circuit 10) after passing through the condenser lens 4, the pentaprism 5, a photometry prism 7 and a photometry lens 8.

Figure 3:
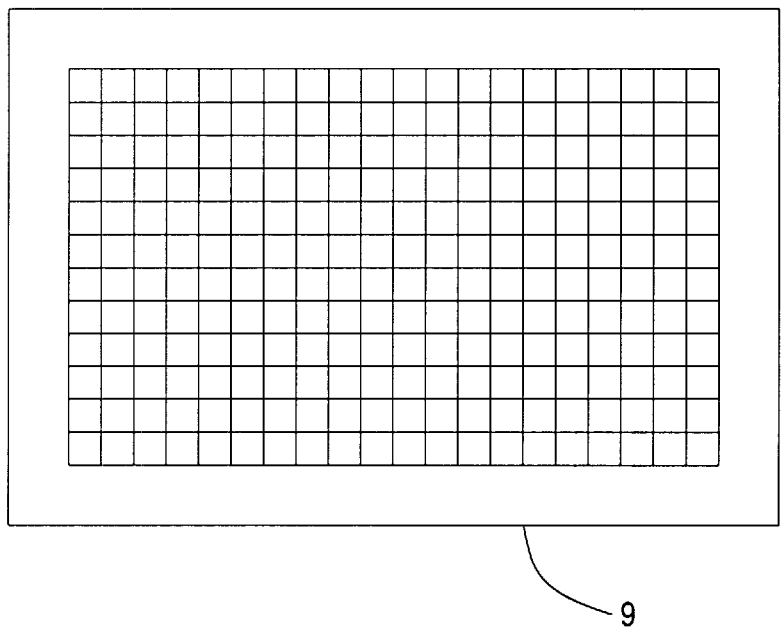
FIG. 3 is a front view of a photometry element, showing the partitioned state of the photometry element of a camera according to the first embodiment.

FIG. 3 is a diagram showing the partitioned state of the photometry element 9 mapped onto the object field. The photometry element 9 is an accumulating sensor such as, for example, a CCD, and can perform photometry by partitioning nearly the entire object field into plural regions. In the present example, the object field is partitioned into twelve vertical sections and twenty horizontal sections, totaling 240 regions.

Figure 4:
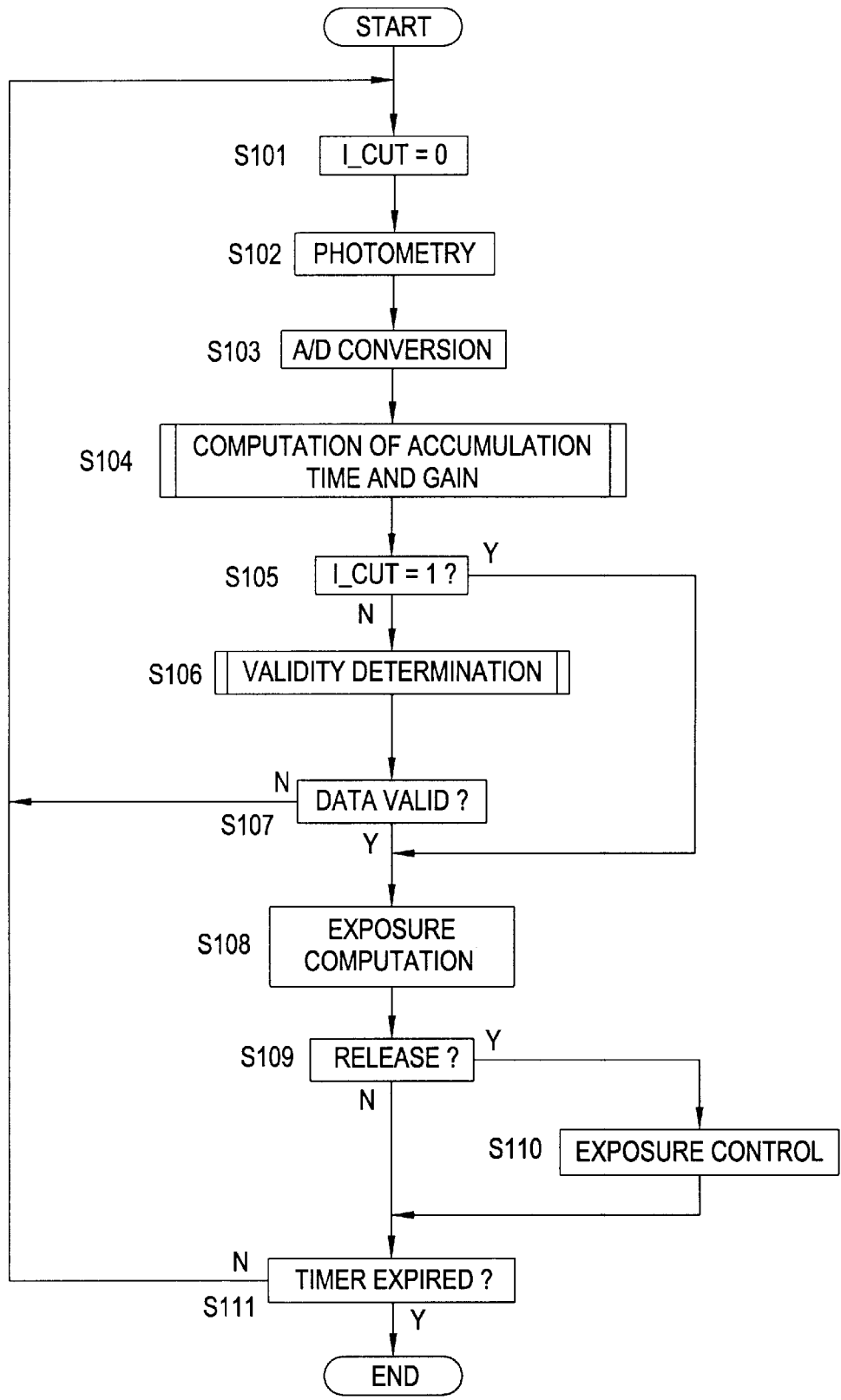
FIG. 4 is a flow chart of the main operating routine of a camera according to the first embodiment.

FIG. 4 is a main flow chart of a program executed by the microcomputer 21 according to the present preferred embodiment. This program is executed when the power supply of the camera is switched ON and when the release button of the camera (not shown) is half depressed.

First, in step S101 the photometry prohibiting interrupt flag, I_CUT, is initialized to 0. Next, in step S102, accumulation by the photometry element 9 and photometry of the object field are performed based on the accumulation time and gain set by step S104 thereafter. Because step S104 has not been performed prior to the initial round of photometry after the power supply is switched ON, the accumulation time and gain are set to default values. For example, the initial default values during start of the power supply can be the accumulation time=1 mS and the gain=L. When the accumulation has finished, A/D conversion of the photometry output is performed (by A/D converter 11), and the photometry data is output.

In step S104, as described above, the accumulation time and gain that are to be used during the next round of photometry are computed based on the photometry data obtained in step S103. The methods of computing the accumulation time and gain are described in more detail with respect to the subroutine of FIG. 7. In step S105, it is determined whether the photometry prohibiting interrupt flag I_CUT is set to 1. That is, it is determined whether the photometry prohibiting signal has been generated during accumulation, in which case the accumulation has been interrupted. Flow proceeds to step S108 if I_CUT=1; whereas flow advances to step S106 if I_CUT=0. In other words, validity determination is only performed when the photometry operation was not interrupted.

In step S106, it is determined whether the photometry data obtained in step S103 is within the range of proper values. In other words, determination of the validity or invalidity of the photometry data is performed in step S106. The method of determining validity is described in detail with respect to the subroutine of FIG. 6. In step S107, it is determined whether the determination results of step S106 are valid. Flow advances to step S108 if valid; whereas flow returns to step S101 if invalid, in which case photometry is re-started.

In step S108, computation of the proper exposure is performed by any number of well-known methods based on the photometry data of the 240 regions shown in FIG. 3. In step S109, it is determined whether the release button (not shown) is fully depressed. Flow advances to step S111 after having performed exposure to the film based on the proper exposure set in step S110 if fully depressed; whereas flow proceeds directly to step S111 if the release button is not fully depressed. In step S111, it is determined using a half depression timer whether a specified time has elapsed after release of half depression. If the half depression is continuing or is within the specified time, flow returns to step S102 and repeats the process. If the timer has expired, the program ends.

Figure 5:
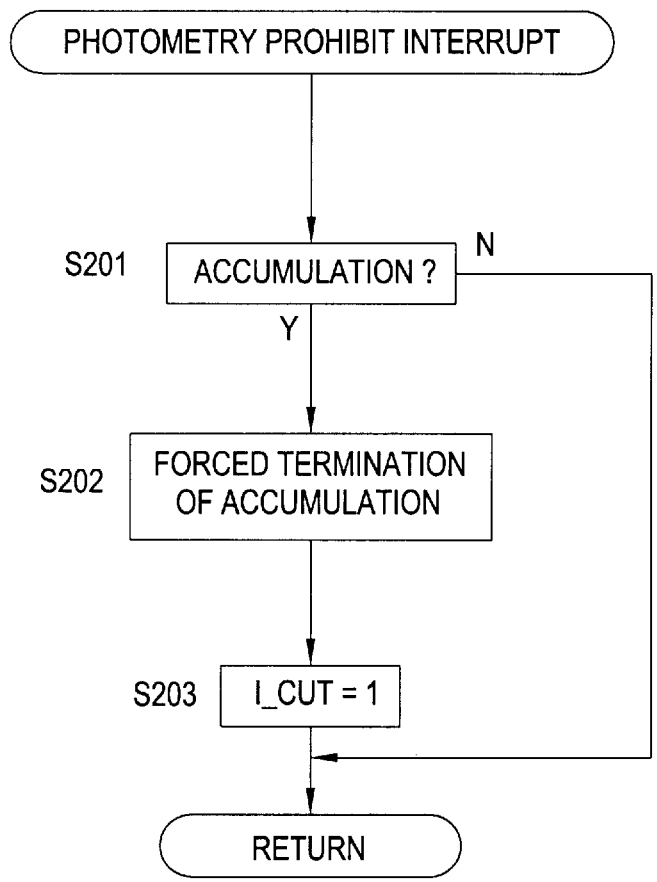
FIG. 5 is a flow chart of a photometry prohibiting interrupt routine of a camera according to the first embodiment.

FIG. 5 is a flow chart showing an interrupt process executed by the microcomputer 21 when the photometry prohibiting signal has been generated. The process of this flow chart is synchronized with the time of generation of the photometry prohibiting signal (e.g., the FIG. 5 process can be initialized when the photometry prohibiting signal is output) and is processed in priority even when executing the main flow chart of FIG. 4. First, in step S201 it is determined whether the photometry element 9 is accumulating. If accumulation is not occurring, processing ends as it is, and flow returns to the main flow chart. If photometry element 9 is accumulating, accumulation is forced to end in step S202, and the data is read from the photometry element 9. If accumulation was occurring when this flow chart was called, because S102 of the main flow chart necessarily was being executed, in step S202, reading-in of the data accumulated in photometry element 9 is performed automatically by step S103 after returning to the main flow chart only when forced termination of accumulation was performed. Next, in step S203, the value 1 is assigned to the photometry prohibiting interrupt flag I_CUT. Flow then returns to the main flow chart. Thus, the processing of the FIG. 5 flow chart is performed whenever the photometry prohibiting signal is generated, resulting in I_CUT being assigned a value of 1 if accumulation was taking place at that time.

Figure 6:
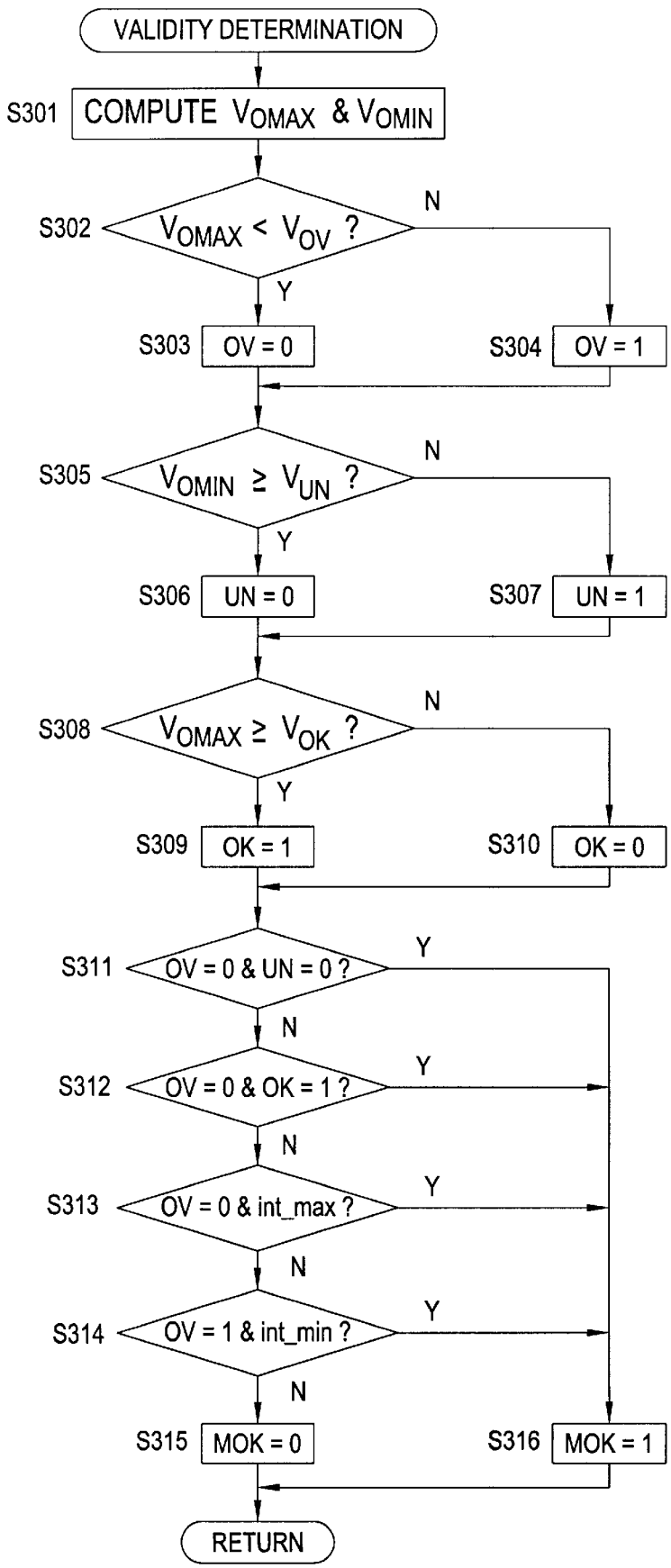
FIG. 6 is a flow chart of a validity determination routine of a camera according to the first embodiment.

FIG. 6 is a flow chart of a subroutine that determines the validity of the photometry data according to the present preferred embodiment. This subroutine is called and executed when step S106 of FIG. 4 is executed.

First, Vomax and Vomin are determined in step S301. Vomax is, among the photometry data of the 240 regions shown in FIG. 3, the photometry data of the region in which the signal component is greatest. Conversely, Vomin is the photometry data of the area in which the signal component is smallest. Next, it is determined in step S302 whether the following equation 1 is established:

$$Vomax < Vov \quad (1)$$

Here, Vov is the saturated output voltage of the photometry element 9, which is recorded in non-volatile memory (not shown) inside the camera for H gain and for L gain. The appropriate value from the non-volatile memory is assigned according to the gain at which the photometry was performed. When equation 1 is established, because all the photometry data is at the saturated output or below, flow advances to step S303, and 0 is assigned to the overflow flag OV. Otherwise, flow proceeds to step S304, where flag OV is set to 1.

Next, it is determined in step S305 whether the equation 2 shown below is established:

$$Vomin \geq Vun \quad (2)$$

Here, Vun is the underflow voltage of the photometry circuit 10 including the photometry element 9. When the photometry data is at or below Vun, it indicates that the noise component is greater than the signal component from the photometry, and that there is no reliability in the data. Vun is recorded in non-volatile memory (not shown) inside the camera for H gain and for L gain. As described above, the appropriate value from the non-volatile memory is assigned according to the gain at which the photometry was performed. When equation 2 is established, because all the photometry data is at or above the underflow voltage, flow advances to step S306, and 0 is assigned for the underflow flag UN. When equation 2 is not established, because at least one region is under flow, flow advances to step S307, and 1 is assigned to the underflow flag UN.

Next, it is determined in step S308 whether the equation 3 shown below is established:

$$Vomax \geq Vok \quad (3)$$

Here, Vok is the value indicating validity of the photometry data. When Vomax is at or above Vok as in equation 3, it is possible for the photometry output of the dark regions to achieve a sufficient S/N (signal to noise) ratio to the extent that an influence is extended to the proper exposure computation even when there is a brightness difference in the object field. Consequently, it can be said in this case that the data is valid. Vok is recorded in non-volatile memory (not shown) inside the camera for H gain and for L gain. As above, the appropriate value from the non-volatile memory is assigned according to the gain at which the photometry was performed. When equation 3 is established, because the photometry data is valid, flow advances to step S309, and 1 is assigned to the validity flag OK. When equation 3 is not established, the photometry data is determined to be invalid, and flow advances to step S310, where 0 is assigned to the validity flag OK.

Next, in step S311, it is determined whether OV=0 and UN=0. That is, it is determined whether the photometry data is neither overflowed nor underflowed. If such is the case, because all the photometry data is taken within the photometrically possible range, the photometry results finally are considered valid, and 1 is assigned to the final validity flag MOK in step S316.

When the result of step S311 is negative, flow advances to step S312, where it is determined whether OV=0 and OK=1. When step S312 is affirmative, because there is underflow, but no overflow, and more particularly because $Vomax \geq Vok$ is satisfied, it indicates that the photometry data is usable for computation of proper exposure values. Consequently, even in this case, flow advances to step S316 where MOK is set to 1.

When the result of step S312 is negative, flow advances to step S313, where it is determined whether OV=0 and int_max was used for photometry. In other words, step S313 determines whether overflow did not occur when the accumulation time was at the maximum value. When this is affirmative, because $Vomax \geq Vok$ is not satisfied, but the accumulation time was at a maximum, it indicates that the photometry output cannot be increased any further. Consequently, in this case, adjustment of the output level has been performed to the greatest extent possible, and since further improvement is not expected, MOK=1 is assigned in step S316.

When the result of step S313 is negative, it is determined in step S314 whether OV=1 and int_min was used for photometry. Thus, step S314 determines whether there was the occurrence of overflow when the accumulation time was at a minimum value. When this is affirmative, because Vomax<Vov is not satisfied, but the accumulation time was at a minimum, it indicates that the photometry level cannot be decreased any further. Consequently, in this case, adjustment of the output level has been performed to the greatest extent possible, and since further improvement is not expected, MOK=1 is assigned in step S316. If the result of step S314 is negative, adjustment of the output level is considered insufficient, and MOK=0 is assigned in step S315, ending the process.

Figure 7:
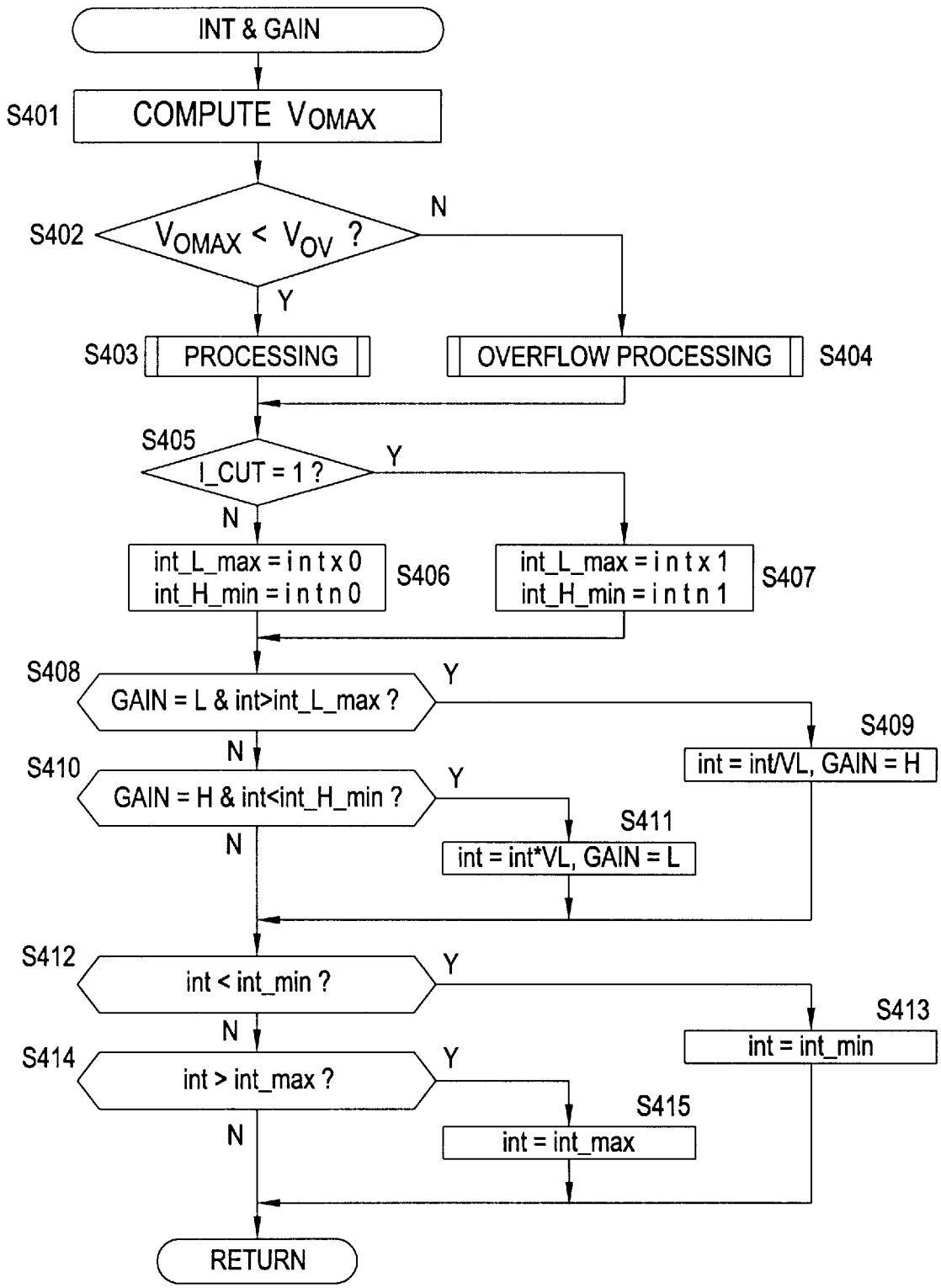
FIG. 7 is a flow chart of a routine that sets the accumulation time and amp gain for a subsequent round of photometry in a camera according to the first embodiment.

FIG. 7 is a flow chart of a subroutine that determines the accumulation time int for a subsequent round of photometry (i.e., the next round) according to the present preferred embodiment. This subroutine is called and executed when step S104 of FIG. 4 is executed. Before this subroutine is called, the immediately prior photometry data (either the default values mentioned earlier or values set during a previous round of photometry) remains in the memory (not shown) inside the microcomputer 21.

In step S401, Vomax is determined in the same manner as in step S301 of FIG. 6 described above. Alternatively, the value of Vomax determined in step S301 may be stored in memory and used as it is. In step S402, it is determined in the same manner as in step S302 described above whether Vomax<Vov, that is, whether the photometry data has overflowed. Alternatively, the flag OV from the results of the determination in step S302 may be stored in memory and used as it is. When the photometry data has not overflowed, flow advances to step S403, and the accumulation time for the next round of photometry is computed using an accumulation time processing routine that is appropriate for situations in which overflow did not occur. The content of this routine is explained in more detail below with respect to FIG. 8. When the photometry data has overflowed, flow advances to step S404, and the accumulation time for the next round of photometry is computed using an overflow accumulation time processing routine that is appropriate for situations in which overflow occurred. The content of this routine is explained in more detail below with respect to FIG. 9.

Next, it is determined in step S405 whether I_CUT=1, that is, whether a photometry prohibiting interrupt has occurred during photometry accumulation. If I_CUT=0, that is, a photometry prohibiting interrupt has not occurred, flow advances to step S406, and parameters are established as in the equations 4 and 5 shown below:

$$int\_L\_max = intx0 \quad (4)$$

$$int\_H\_min = intn0 \quad (5)$$

Here, int_L_max and int_H_min are parameters that are used in determining whether to switch the gain of the photometry circuit 10. Specifically, the gain of the photometry circuit 10 during the subsequent round of photometry is switched to high gain (H) or low gain (L) by comparing the length of the accumulation time for the next round set in step S403 or in step S404 with the above two parameters. The content of the process is explained in more detail starting with step S408.

Meanwhile, if I_CUT=1, that is, if a photometry prohibiting interrupt has occurred, flow advances to step S407, and parameters are established as in the equations 6 and 7 shown below:

$$int\_L\_max = intx1 \quad (6)$$

$$int\_H\_min = intn1 \quad (7)$$

Thus, different values are assigned to the parameters int_L_max and int_H_min based on a determination as to whether an accumulation interrupt has occurred. The significance of these differences will become clear from the following description.

In step S408, it is determined whether the present gain setting of the photometry circuit 10 is L, that is, low gain. Additionally, it is determined whether the next round accumulation time int set in step S403 or step S404 is greater than int_L_max. When the result of step S408 is affirmative, that is, the gain is L and the accumulation time is longer than int_L_max, flow advances to step S409, where the accumulation time int for the next round of photometry is set to be the current time int divided by VL, as shown in equation 8, and the gain is switched to H.

$$int = int/VL \quad (8)$$

Figure 10:
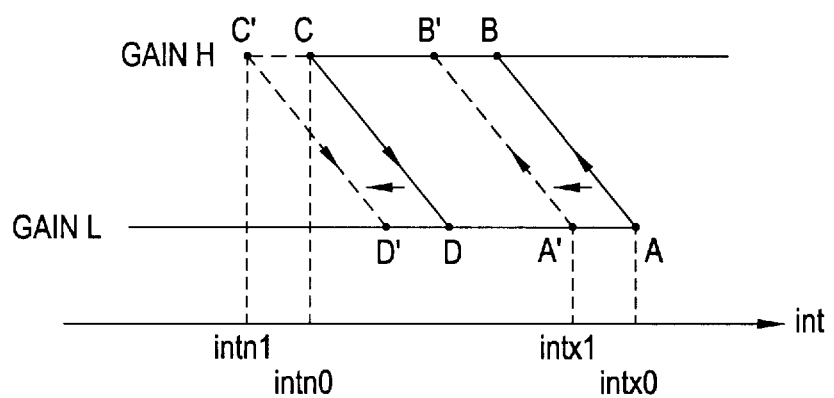
FIG. 10 illustrates how the accumulation time and gain of the first embodiment are established.

Here, VL is the gain constant of the photometry circuit 10. Specifically, VL represents how many times larger the H gain output is relative to the L gain output. FIG. 10 illustrates the processing of this case. The processing of step S409 corresponds to switching from A to B (when I_CUT=0) in FIG. 10, or switching from A' to B' (when I_CUT=1). Referring to FIG. 10, the gain will be switched (from L to H) and the accumulation time (int) will be shortened only when, for an accumulation using a gain of L, the accumulation time has a length of A or greater when there was not an interruption. When, however, an interruption occurred, the gain will be switched (from L to H) and the accumulation time will be shortened when the accumulation time had the shorter duration of A' (or a value greater than A'). Thus, the threshold for switching the gain from L to H and for reducing the accumulation time is lowered when an interruption occurs. This increases the likelihood that the next round of accumulation will take place in a time period that is short enough to avoid the occurrence of an interruption even during continuous photography.

When the result of step S408 is negative, that is, when the gain is H or the accumulation time is not longer than int_L_max, it is determined in step S410 whether the next round accumulation time int set in step S403 or in step S404 is smaller than int_H_min and whether the gain is H. When the result of step S410 is affirmative, that is, when the gain is H and the accumulation time is short, flow advances to step S411, where the next round accumulation time int is multiplied by VL as shown in equation 9, and the gain is switched to L.

$$int = int \times VL \quad (9)$$

Also, referring to FIG. 10, the processing of step S411 corresponds to switching from C to D (when I_CUT=0), or switching from C' to D' (when I_CUT=1). In this manner, when the gain is H and int is small, the better signal to noise characteristics of the L gain is utilized by switching the gain to L and making int longer. As can be appreciated from FIG. 10, when the gain is H, the threshold for switching the gain from H to L and for increasing the accumulation time is decreased when an interruption occurs. Thus, lower values of int (the accumulation time) are permitted when interruptions occur, which minimizes the possibility of subsequent interruptions occurring. Also, when switching the gain between H and L, as shown in FIG. 10, due to hysteresis, stable control becomes possible even in spite of photometric scattering and cases when the brightness has varied minutely in the vicinity of the switching points.

Thus, when I_CUT=1, that is, when a photometry prohibiting interrupt has occurred during photometry accumulation, the duration of the next round accumulation time is made shorter than the usual case (when there is no interrupt) by shifting the switching points (i.e., the values of parameters int_L_max and int_H_min) in the shorter direction of the accumulation time. This enables the next round of photometry to be performed immediately after the photometry prohibition has been released because when a photometry prohibiting interrupt has occurred, it indicates that the release state of the camera, that is, the exposure state has been entered due to the shutter being fully depressed. In particular, when the film supply mode is a high-speed advancing mode, once the first exposure has finished, the mirror has gone down, and the photometry prohibition has been released, a second exposure may begin and another photometry prohibition signal may occur. In order to avoid such an occurrence, the present process makes the time spent in photometry shorter than usual in the first round of photometry that occurs after release of the photometry prohibition signal (i.e., by reducing the accumulation time). From the second round of photometry onward, after release of the photometry prohibition signal, because the newest photometry data already is obtained and the first round (after occurrence of an interruption) has finished (and there very likely was not an interruption of the previous accumulation), the process returns again to the usual state (e.g., using a gain of L), which has a better signal to noise ratio. However, due to hysteresis, for example, it is also likely that the subsequent rounds will use accumulation times that are shorter than the accumulation time that led to a photometry interruption. Accordingly, it is likely that these subsequent rounds will not be interrupted, even though they are performed at a gain of L.

Next, in step S412, the determination of equation 10 is performed:

$$int < int\_min \quad (10)$$

Here, int_min is the minimum accumulation time of the photometry circuit 10. That is, in step S412 it is determined whether the value of int set for the next round is smaller than the minimum value. If the result of step S412 is affirmative, the next round int is set to int_min in step S413. When the result of step S412 is negative, the determination of equation 11 is performed by step S414:

$$int > int\_max \quad (11)$$

Here, int_max is the maximum accumulation time of the photometry circuit 10. That is, in step S414 it is determined whether the value of int set for the next round is greater than the maximum value. When the result of step S414 is affirmative, the next round int is set to int_max in step S415.

The typical values of each parameter in the above processing are shown below.

$$int\_min = 10\ \mu S \quad (12)$$

$$int\_max = 100\ mS \quad (13)$$

$$intx0 = 80\ mS \quad (14)$$

$$intn0 = 10\ mS \quad (15)$$

$$intx1 = 40\ mS \quad (16)$$

$$intn1 = 5\ mS \quad (17)$$

$$VL = 4 \quad (18)$$

Figure 8:
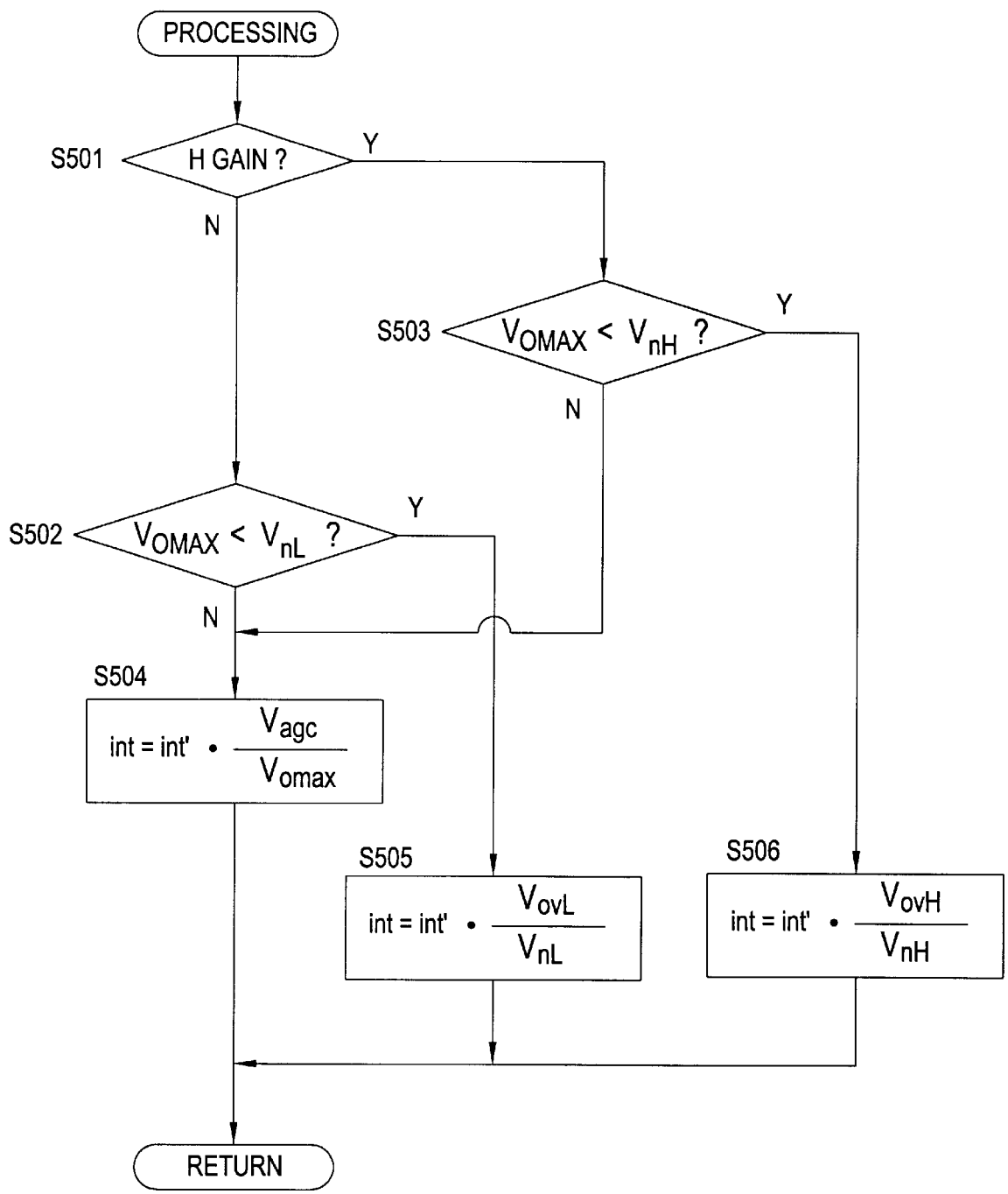
FIG. 8 is a flow chart of a usual processing routine for setting the accumulation time, int, of a camera according to the first embodiment.

FIG. 8 is a flow chart of a subroutine for computing the next round accumulation time in the usual accumulation time processing according to the present preferred embodiment. This subroutine is called and executed when step S403 of FIG. 7 is executed. First, it is determined in step S501 whether the gain of the photometry circuit 10 is H. If the gain is L, it is determined in step S502 whether Vomax is smaller than VnL, and flow advances to step S505 if it is smaller and to step S504 if this is not so. Here, VnL is the noise level of the photometry output in the case of L gain. If Vomax was at or below VnL, it indicates that all the photometry outputs were at or below the noise level.

In step S501, if the gain is H, it is determined in step S503 whether Vomax is smaller than VnH. Flow advances to step S506 if Vomax was smaller and to step S504 if this is not so. VnH is the noise level of the photometry output in the case of H gain. If Vomax was at or below VnH as with VnL, it indicates that all the photometry outputs were at or below the noise level.

In step S504, the next round accumulation time int when Vomax is greater than the noise level is computed by the equation 19 shown below:

$$int = int' \cdot Vagc/Vomax \quad (19)$$

Here, Vagc indicates the target level of Vomax of the photometry data in the next round of photometry, and is set to a somewhat lower value than the saturated output voltage of the photometry circuit 10. The standard values are saturated output voltage=3.4V and Vagc=3V. Also, int' is the accumulation time of the previous round of photometry.

In step S505, the next round accumulation time int is set when Vomax was at or below the noise level during L gain, and is computed using the equation 20 below:

$$int = int' \cdot VovL/VnL \quad (20)$$

Here, VovL is the saturated output voltage at L gain; its standard value is about 3.4V as described above, and the standard value of VnL is about 40 mV.

In step S506, the next round accumulation time int is set when Vomax was at or below the noise level during H gain, and is computed using the equation 21 below:

$$int = int' \cdot VovH/VnH \quad (21)$$

Here, VovH is the saturated output voltage at H gain; its standard value is about 3.4V as described above, and the standard value of VnH is about 160 mV.

Figure 9:
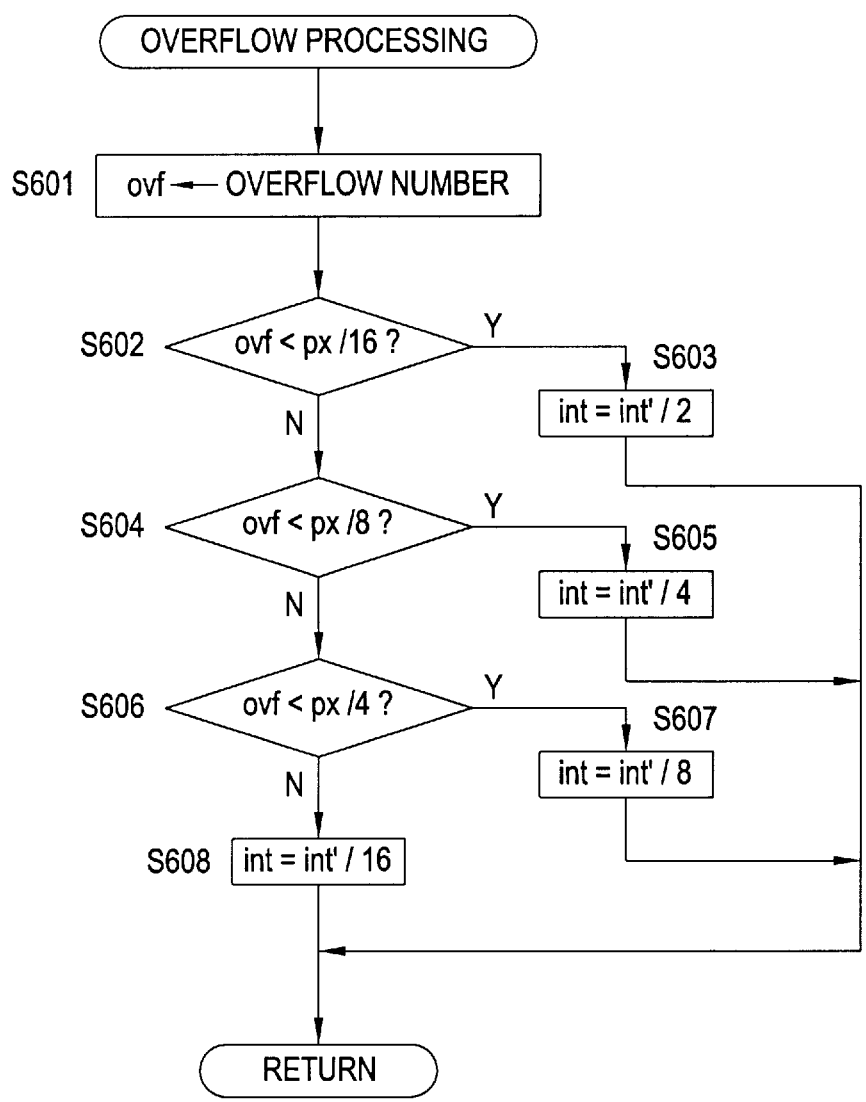
FIG. 9 is a flow chart of an overflow processing routine for setting the accumulation time, int, of a camera according to the first embodiment.

FIG. 9 is a flow chart of the subroutine for setting the next round accumulation time int when the Vomax of the photometry output of the previous round has overflowed. This subroutine is called and executed when the step S404 of FIG. 7 is executed. First, in step S601, the number of overflowed regions among the 240 photometry regions is determined. In other words, it is determined how many areas of the output are at VovL or above if the gain is L, or at VovH or above if the gain is H. The resulting value is assigned the variable ovf.

Next, it is determined in step S602 whether ovf is less than px/16. Here, px is the number of photometry regions, and in this case, px=240. If the result of step S602 is affirmative, flow advances to step S603, and int is made int'/2, that is, ½ the value of the previous round. If the result of step S602 is negative, it is determined in step S604 whether ovf is less than px/8, and if so, in step S605, int is set to int'/4, that is, to ¼ the value of the previous round. If the result of step S604 is negative, it is further determined in step S606 whether ovf is less than px/4, and if so, in step S607, int is set to int'/8, that is, ⅛ the value of the previous round. If the result of step S606 was also negative, it ends with int=int'/16, that is, 1/16 the value of the previous round.

One advantage of the disclosed embodiment is that exposure computations are made using the data of the photometry element even when accumulation is interrupted by a photometry prohibiting signal. Meanwhile, an accumulation time and gain for use in the next round of photometry is computed taking into account whether the previous accumulation was interrupted. If the accumulation was interrupted, the threshold parameters against which the accumulation time is compared are changed (e.g., parameters int_L_max and int_H_min are changed from their respective first and second values intx0 and intn0 to their respective third and fourth values intx1 and intn1), increasing the likelihood that the accumulation time for the next round of photometry will be decreased (and performed at a gain of H) so as to avoid another interruption in accumulation.

Figure 11:
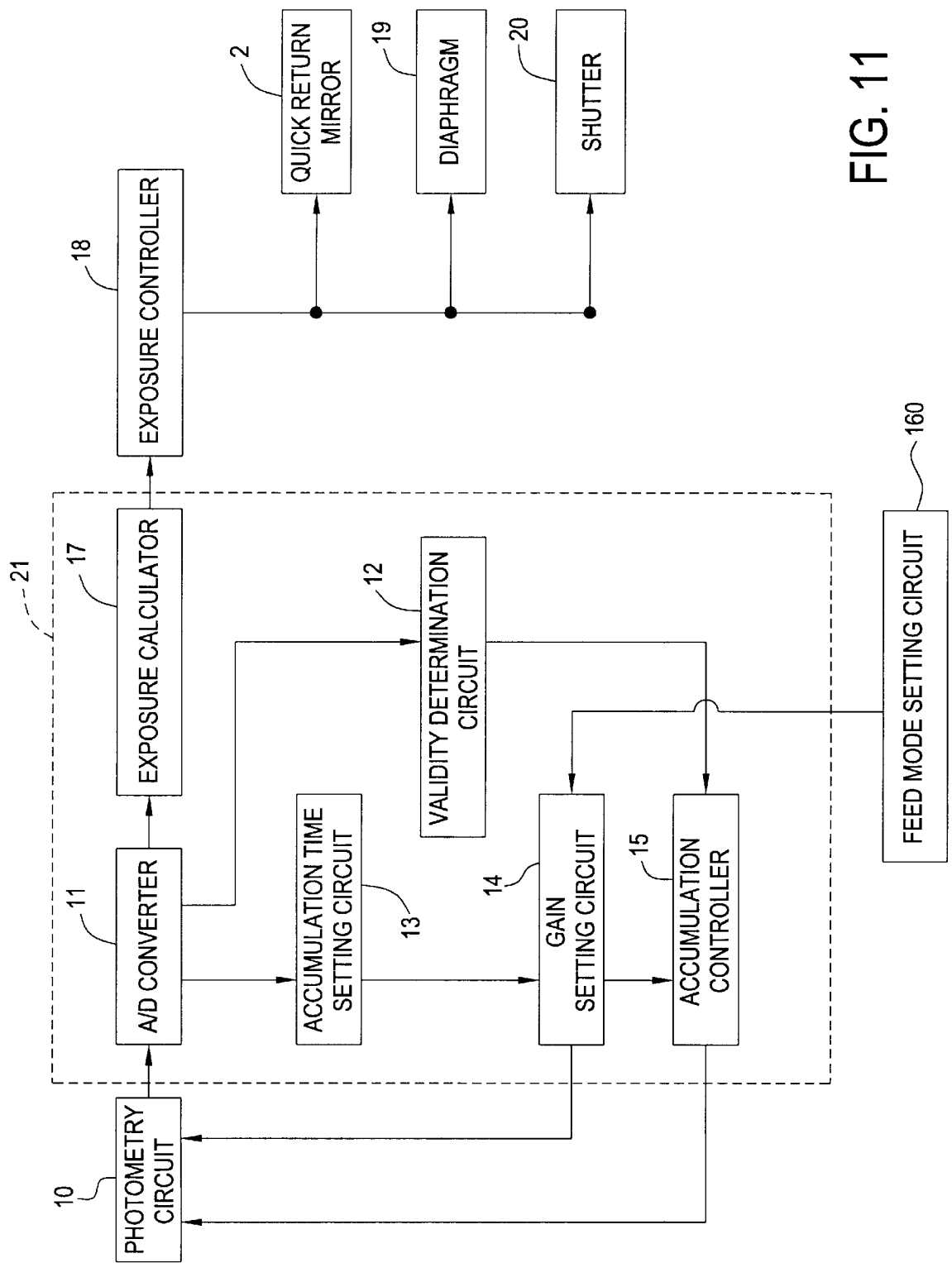
FIG. 11 is a block diagram of a camera equipped with a photometry device according to a second embodiment of the present invention.

FIG. 11 is a block diagram showing the general construction of a photometry device for a camera according to a second embodiment of the present invention. The FIG. 11 embodiment is similar to the FIG. 1 embodiment except that feed mode setting circuit 160 is substituted for photometry prohibiting signal generator 16. A photometry circuit 10 performs photometry on an object field using an accumulation type of photometry element, such as, for example, a CCD (charge-coupled device). The output of the photometry circuit 10 is supplied to an A/D converter 11. The output amperage of the photometry circuit 10 can be switched between a gain H, in which a high output is obtained, and a gain L, in which there is a low output but a small amount of noise.

The A/D converter 11 transforms the analog output of the photometry circuit 10 into a numerical value, which is output therefrom as photometry data. The photometry data output by the A/D converter 11 is provided to a validity determining circuit 12, an accumulation time setting circuit 13 and an exposure calculator 17.

The validity determining circuit 12 determines whether the photometry data obtained from the A/D converter 11 falls within an optimum range of numerical values. When the photometry data falls within this range, the data is considered valid. Alternatively, when the photometry data does not fall within this range, the photometry operation is performed again. The method of determining whether the photometry data is valid is described in more detail below.

The accumulation time setting circuit 13 utilizes the photometry data output by the A/D converter 11 to set (establish) the accumulation time to be used for the next round of photometry. The output of the accumulation time setting circuit 13 is supplied to a gain setting circuit 14. The gain setting circuit 14, along with the accumulation time setting circuit 13, determines the gain and accumulation time to be used by the photometry circuit 10 during the next round of photometry based on the output of a feed mode setting circuit 160, which will be described below. The accumulation time calculation method and gain determining method will be described in detail below.

An accumulation controller 15 outputs a control signal that controls the start and finish of the accumulation of charge by the photometry circuit 10 based on the output of the validity determining circuit 12 and the gain setting circuit 14. The output of the accumulation controller 15 is supplied to the photometry circuit 10.

The feed mode setting circuit 160 sets the feed mode of the film. In particular, circuit 160 performs three types of settings: a high speed continuous feed mode (CH) for performing high speed continuous photography for as long as the camera release button (not shown) is being continuously pressed; a low speed continuous feed mode (CL) for performing low speed continuous photography for as long as the release button is continuously pressed; and a single feed mode (S) for performing photography only for one round (i.e., only a single photograph is taken) when the release button is pressed.

The exposure calculator 17 calculates the proper exposure values based on the photometry data supplied from the A/D converter 11. The output of the exposure calculator 17 is supplied to the exposure controller 18.

The exposure controller 18 performs exposure control based on the proper exposure values supplied from the exposure calculator 17. In particular, the exposure controller 18 causes the mirror 2 to spring up, and the diaphragm 19 and the shutter 20 to be controlled to perform proper exposure when it receives a release signal that is generated when the photographer presses the release button.

In the present embodiment, the A/D converter 11, the validity determining circuit 12, the accumulation time setting circuit 13, the gain setting circuit 14, the accumulation controller 15 and the exposure calculator 17 are entirely realized by a one-chip microcomputer 21. It is, however, within the scope of the invention to perform the functions of these components by other means. For example, the invention can be implemented using a plurality of separate dedicated or programmable integrated or other electronic circuits or devices (e.g., hardwired electronic or logic circuits such as discrete element circuits, or programmable logic devices such as PLDs, PLAs, PALs, or the like). A suitably programmed general purpose computer, e.g., a microprocessor, microcontroller or other processor device (CPU or MPU), either alone or in conjunction with one or more peripheral (e.g., integrated circuit) data and signal processing devices can be used to implement the invention. In general, any device or assembly of devices on which a finite state machine capable of implementing the flow charts shown in the figures can be used as a controller with the invention.

The optical system of a camera according to the second embodiment of the invention can be the same as shown in FIG. 2. Additionally, the photometry element 9 can be partitioned as shown in FIG. 3.

Figure 12:
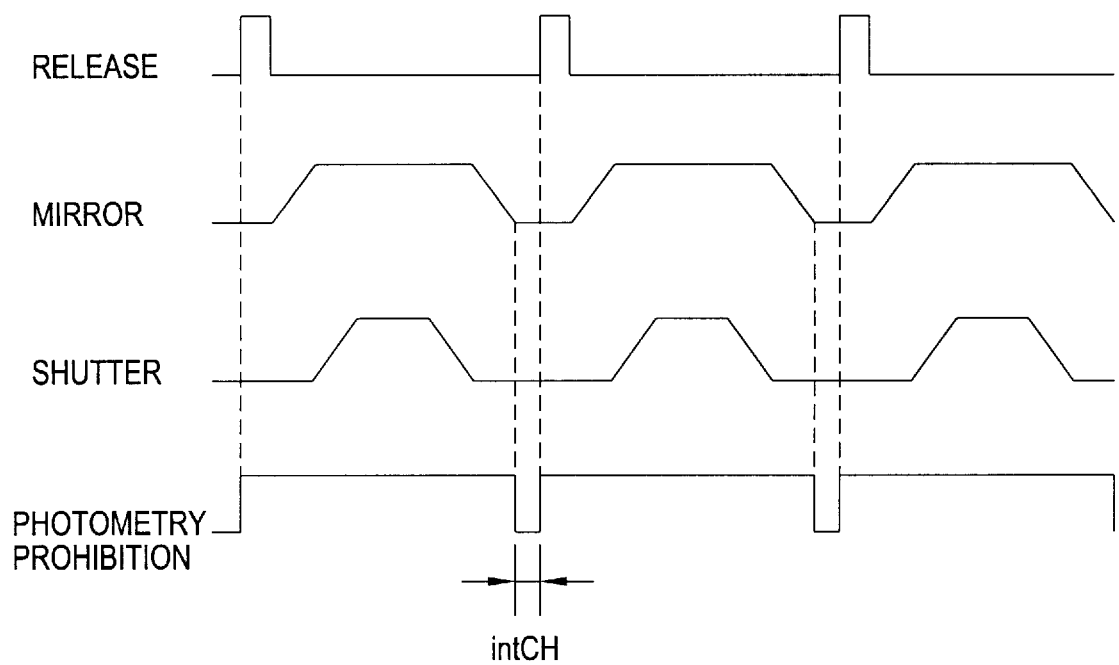
FIG. 12 is a timing chart for performing photometry with the photometry device according to the second embodiment of the invention.

FIG. 12 is a timing chart that simply illustrates the photometry timing and operation of the mirror and shutter during the high speed continuous feed mode (CH). First, when the release button is pressed, the value of the release timing flag becomes H. This causes the mirror 2 to begin to go up. Additionally, photometry is prohibited because the value of a photometry prohibiting flag becomes H based on the release timing flag becoming H.

When the accumulation controller 15 is in the middle of an accumulation operation and it is detected that the photometry prohibiting flag value equals H, the accumulation controller 15 immediately ends the accumulation (even when this occurs in the middle of accumulation), performs the read-out of data and does not perform another round of accumulation until the photometry prohibiting flag once again has an L state. When it is detected that the photometry prohibiting flag value equals H when accumulation was not being performed, controller 15 waits to perform another round of accumulation until the photometry prohibiting flag has an L state.

Meanwhile, once the mirror has finished rising, the shutter opens for the prescribed time period (the duration of which has been set in advance), and then closes. When the shutter has closed, the mirror begins to descend. After the mirror has finished its descent, the photometry prohibiting flag is returned to the L state, and the photography of the first round is completed. At this time, when the release button is being continuously pressed, after the time period intCH has passed, the release flag again is set to the H state, and the operation is repeated.

Figure 13:
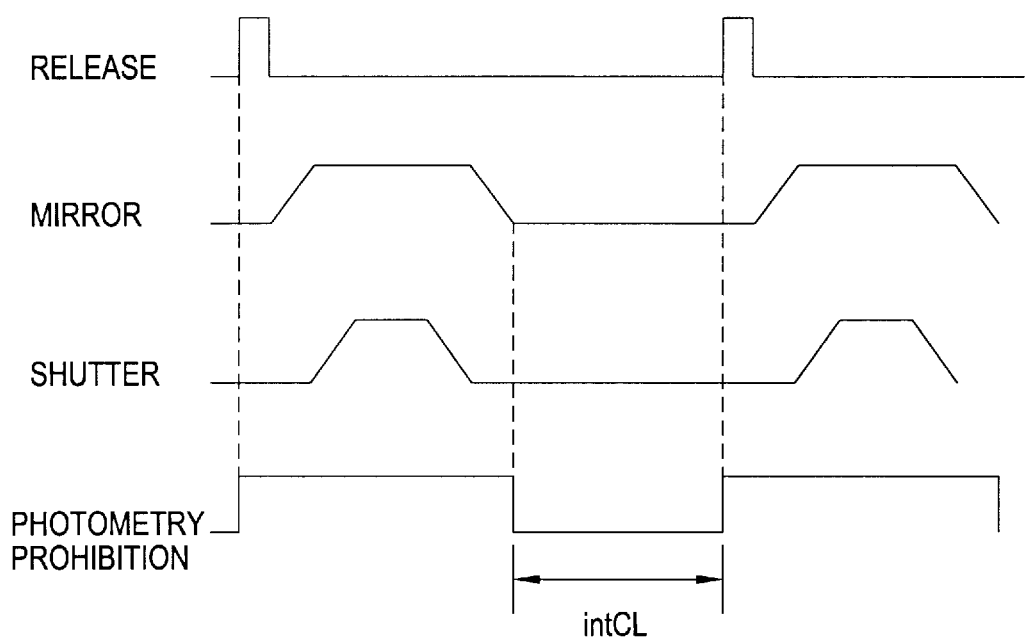
FIG. 13 is another timing chart for performing photometry with the photometry device according to the second embodiment of the invention.

FIG. 13 is a timing chart that simply illustrates the photometry timing and operation of the mirror and shutter during the low speed continuous feed mode (CL). The basic operation is similar to that described in FIG. 12. However, the time period between each round of photography is intCL, which is longer than intCH of FIG. 12.

Figure 14:
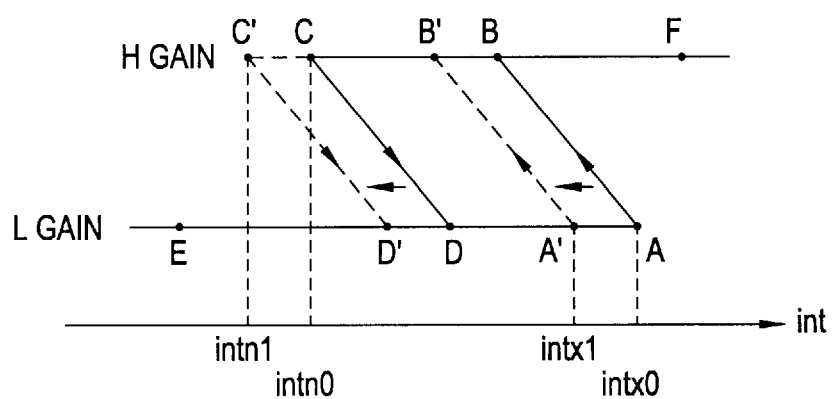
FIG. 14 illustrates how the accumulation time and gain are established for the photometry device according to the second embodiment of the invention.

FIG. 14 illustrates how the gain switching points are changed according to the feed mode and the relationship between the accumulation time and the gain switching point of the photometry circuit 10 of the second embodiment. When the brightness of the object field is sufficiently high (i.e., when it is bright), the gain of the photometry circuit 10 is set to L. Assuming that initially the accumulation time is such that the relationship between the accumulation time and the gain is, for example, represented by the point E in FIG. 14, when the brightness gradually decreases, the accumulation time for photometry lengthens, passes through point D and finally arrives at point A.

When the brightness decreases further (such that the accumulation time lengthens beyond time intx0), the gain is switched from L (the low speed (sensitivity) side) to H (the high speed (sensitivity) side). This also shortens the accumulation time such that it arrives at point B. When the brightness decreases further, the gain remains at H, draws near to the point F, where it finally becomes the greatest possible accumulation time. This is known as the photometry low brightness limit.

When the process moves from point A to point B, the gain remains at H for a while due to hysteresis associated with the switching of the gain. Thus, even if the brightness increases, the gain is not immediately returned to the gain L. Rather, the gain remains at the gain H and the accumulation time shortens to the point C. When the brightness further increases after point C is reached, the gain switches over to L by moving to point D (i.e., the accumulation time also is increased).

The switching points shown by a solid line in FIG. 14 are used when the feed mode of the film is the single feed mode (S) or when it is the low speed continuous feed mode (CL). When the feed mode is the high speed continuous feed mode (CH), the gain changeover points A, B, C and D are moved to the short side of the accumulation time, to points A', B', C' and D', respectively as shown by the dotted line in FIG. 14. The accumulation time intx0, which corresponds to the switching point A from the gain L to the gain H, preferably has a value that is less than or equal to the interval time intCL in FIG. 13. The accumulation time intx1, which corresponds to the switching point A', preferably has a value that is less than or equal to the interval time intCH in FIG. 12. By choosing such values for use during continuous photography, the chances of photometry being interrupted are lowered regardless of whether the gain is being switched to gain H due to the accumulation time being long, or the gain is remaining as gain L due to the brightness being high.

Figure 15:
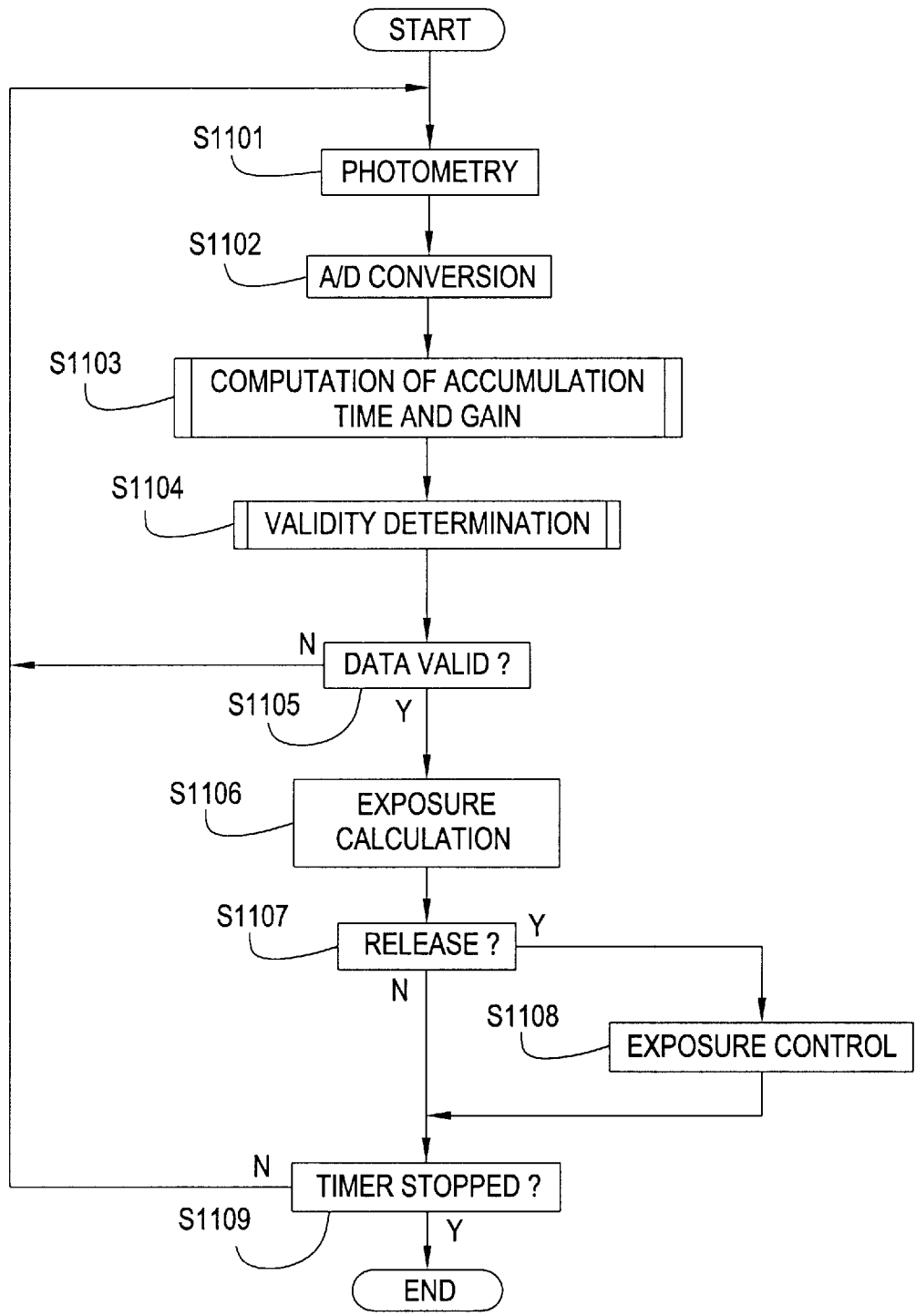
FIG. 15 is a flow chart of the main operating routine of a camera according to the second embodiment of the invention.

FIG. 15 is a main flow chart of a program executed by the microcomputer 21 according to the second embodiment. This program is executed when the power supply of the camera is ON and when the release button (not shown) of the camera is half-depressed.

First, in step S1101, photometry is performed for the object field by performing accumulation with the photometry element 9 based on the accumulation time and gain set by step S1103, which will be explained later. Because step S1103 has not been performed prior to the initial round of photometry after the power supply is switched ON, the accumulation time and gain are set to default values. For example, the initial (default) values during start of the power supply can be the accumulation time=1ms and the gain=L. When the accumulation has finished, the A/D conversion of the photometry output is performed (by the A/D converter 11) in step S1102, and the photometry data is output.

In step S1103, as described above, the accumulation time and gain that are to be used during the next round of photometry are calculated based on the photometry data obtained in step S1102. The method of calculating the accumulation time and gain are described in more detail with respect to the flow chart shown in FIG. 16.

In step S1104, a validity determination is performed in which it is determined whether the photometry data obtained in step S1102 is within a proper numerical range. The method of determining the validity is the same as described in detail with respect to FIG. 6.

In step S1105, it is determined whether the result of step S1104 is "valid." Flow proceeds to step S1106 when the data is valid. When the data is "invalid," flow returns to step S1101, in which case photometry is performed again.

In step S1106, calculation of the proper exposure values is performed by any number of known methods based on the photometry data of the 240 regions shown in FIG. 3. In step S1107, it is determined whether the release button (not shown) has been fully depressed. When fully depressed, exposure is performed to the film in step S1108 based on the proper exposure values. Flow then proceeds to step S1109. Flow proceeds directly to step S1109 (from step S1107) in the event that the release button is not fully depressed.

In step S1109, it is determined using a half-depression timer whether a specified time has elapsed after release of the half-depression button. If the half-depression is continuing or is within the specified time, flow returns to step S1101 and the process is repeated. When the timer has expired, the program ends.

Figure 16:
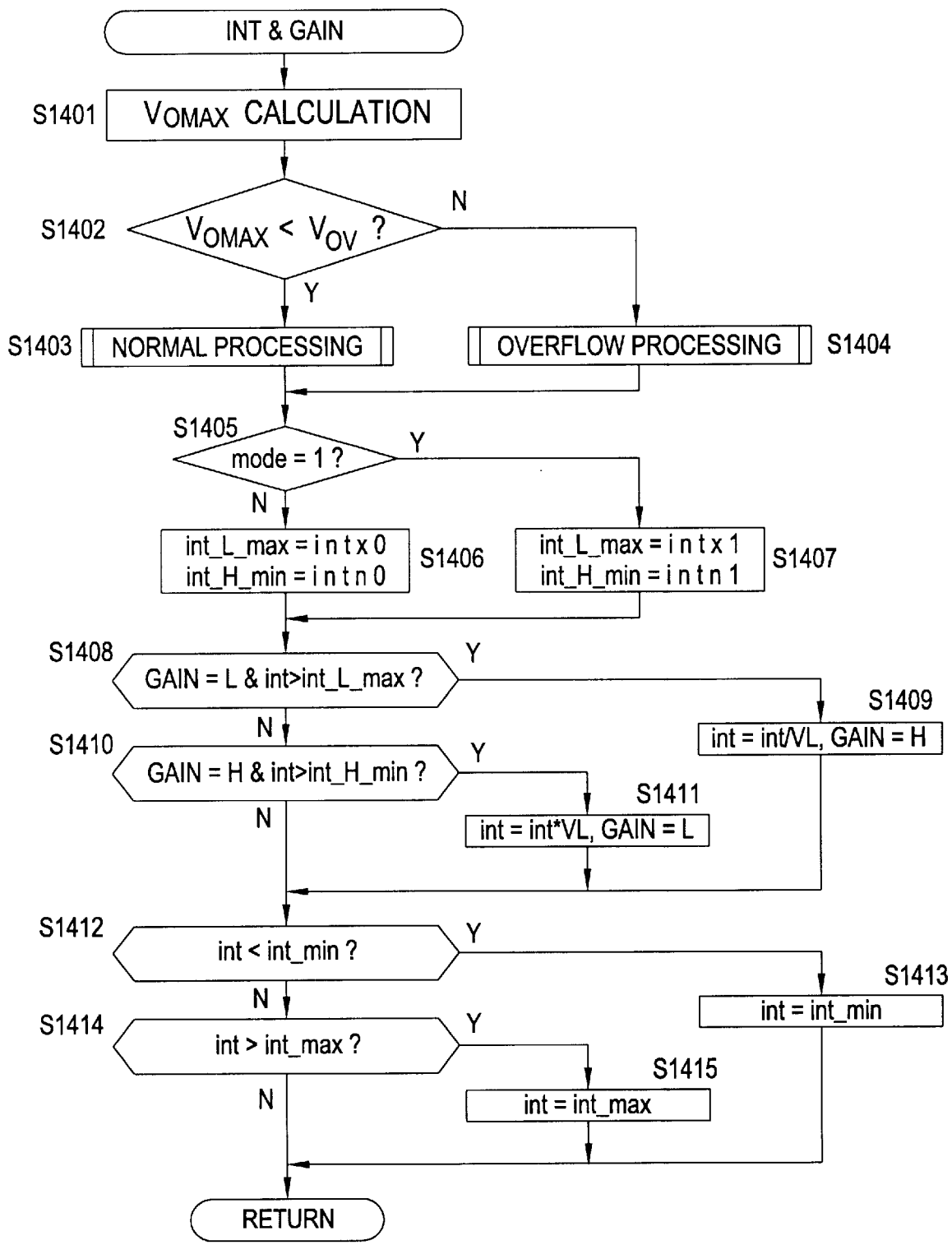
FIG. 16 is a flow chart of a routine that establishes the accumulation time and amp gain for a subsequent round of photometry in a camera according to the second embodiment of the invention.

FIG. 16 is a flow chart of a subroutine that determines the accumulation time int and the amp gain for a subsequent round of photometry (i.e., the next round) according to the first embodiment. This subroutine is somewhat similar to the FIG. 7 subroutine, and is called and executed when step S1103 of FIG. 15 is executed. Before this subroutine is called, the immediately prior photometry data (either the default values mentioned earlier or values set during a previous round of photometry) remains in the memory (not shown) inside the microcomputer 21.

In step S1401, Vomax is determined in the same manner as in step S301 of FIG. 6 described above. Alternatively, the value of Vomax set in step S301 may be stored in memory and used as it is. In step S1402, it is determined in the same manner as in step S302 described above whether Vomax<Vov, that is, whether the photometry data has overflowed. Alternatively, the flag OV from the results of the determination in step S302 may be stored in memory and used as it is. When the photometry data has not overflowed, flow advances to step S1403, and the accumulation time for the next round of photometry is computed using an accumulation time processing routine that is appropriate for situations in which overflow did not occur. The content of this routine was already explained in detail with respect to FIG. 8. When the photometry data has overflowed, flow advances to step S1404, and the accumulation time for the next round of photometry is computed using an overflow accumulation time processing routine that is appropriate for situations in which overflow occurred. The content of this overflow process was explained in detail with respect to FIG. 9.

Next, it is determined in step S1405 whether mode=1, that is, whether the film feed mode is the high speed continuous feed mode (CH). If mode=0, that is, the film feed mode is not the high speed continuous feed mode (CH), in other words, it is the single feed mode (S) or low speed continuous feed mode (CL), flow advances to step S1406, and parameters are established according to the previously described equations 4 and 5 shown below:

$$\text{int\_L\_max} = \text{intx0} \tag{4}$$

$$\text{int\_H\_min} = \text{intn0} \tag{5}$$

Here, int_L_max and int_H_min are parameters that are used in determining whether to switch the gain of the photometry circuit 10. Specifically, the gain of the photometry circuit 10 during the next round of photometry is switched to high gain (H) or low gain (L) by comparing the length of the accumulation time for the next round set in step S1403 or in step S1404 with the above two parameters. The content of the process is explained in detail starting with step S1408.

Meanwhile, if mode=1, that is, the film feed mode is the high speed continuous feed mode (CH), flow advances to step S1407, and parameters are established according to the previously described equations 6 and 7 shown below:

$$\text{int\_L\_max} = \text{intx1} \tag{6}$$

$$\text{int\_H\_min} = \text{intn1} \tag{7}$$

Thus, different values are assigned to the parameters int_L_max and int_H_min based on a determination as to the film feed mode. The significance of the differences will become clear from the following description.

In step S1408, it is determined whether the present gain setting of the photometry circuit 10 is L, that is, low gain. Additionally, it is determined whether the next round accumulation time int set in step S1403 or step S1404 is greater than int_L_max. When the result of step S1408 is affirmative, that is, it is L gain and the accumulation time is longer than int_L_max, flow advances to step S1409, where the accumulation time int for the next round of photometry is set to be the current time int divided by VL, as shown in equation 8, and the gain is switched to H.

$$\text{int} = \text{int}/VL \tag{8}$$

Here, VL is the gain constant of the photometry circuit 10. Specifically, VL represents how many times larger the gain H output is relative to the L gain output. FIG. 14, described above, illustrates the processing of this case. The processing of step S1409 corresponds to switching from A to B (when the feed mode is other than the high speed continuous feed mode) in FIG. 14, or switching from A' to B' (when the feed mode is the high speed continuous feed mode). Referring to FIG. 14, the gain will be switched (from L to H) and the accumulation time (int) will be shortened only when, for an accumulation using a gain of L, the accumulation time has a length of A or greater when not in the high speed continuous feed mode. When, however, the camera is in the high speed continuous feed mode, the gain will be switched (from L to H) and the accumulation time will be shortened when the accumulation time had the shorter duration of A' (or a value greater than A'). Thus, the threshold for switching the gain from L to H and for reducing the accumulation time is lowered when in the high speed continuous feed mode. This increases the likelihood that the next round of accumulation will take place in a time period that is short enough to avoid the occurrence of an interruption even during continuous photography.

When the result of step S1408 is negative, that is, when the gain is H or the accumulation time is not longer than int_L_max, it is determined in step S1410 whether the next round accumulation time int set in step S1403 or step S1404 is smaller than int_H_min and whether the gain is H. When the result of step S1410 is affirmative, that is, when the gain is H and the accumulation time is short, flow advances to step S1411, where the next round accumulation time int is multiplied by VL as shown in equation 9, and the gain is switched to L.

$$int = int \times VL \qquad (9)$$

Also, referring to FIG. 14, the processing of step S1411 corresponds to switching from C to D (when the feed mode is other than the high speed continuous feed mode), or switching from C' to D' (when the feed mode is the high speed continuous feed mode).

In this manner, when the gain is L and int is large, the accumulation time is shortened by switching the gain to H and making int smaller. Conversely, when the gain is H and int is small, the better signal to noise characteristics of the L gain is utilized by switching the gain to L and making int longer. Also, when switching the gain between H and L, as shown in FIG. 14, due to hysteresis, stable control becomes possible even in spite of photometric scattering and cases when the brightness varies minutely in the vicinity of the switching points. Additionally, when the feed mode is the high speed continuous feed mode, the normal amount of time necessary for the next round of accumulation becomes shortened by shifting the switching point to the short side of the accumulation time. As illustrated in FIG. 14, during continuous photography, even when it is only possible to use an accumulation time of intCL or intCH, the gain is switched to gain H so that the accumulation is not interrupted mid-course. As a result, there is little photometry failure in which the accumulation is interrupted mid-course.

Next, in step S1412, the determination of equation 10 is performed:

$$int < int\_min \qquad (10)$$

Here, int_min is the minimum accumulation time of the photometry circuit 10. That is, in step S1412 it is determined whether the value of int set for the next round is smaller than the minimum value. If the result of S1412 is affirmative, the next round int is set to int_min in step S1413. When the result of step S1412 is negative, the determination of equation 11 is performed in step S1414:

$$int > int\_max \qquad (11)$$

Here, int_max is the maximum accumulation time of the photometry circuit 10. That is, in step S1414 it is determined whether the value of int set for the next round is greater than the maximum value. When the result of step S1414 is affirmative, the next round int is set to int_max in step S1415.

The typical values of each parameter in the above processing are shown below:

$$int\_min = 10 \ \mu S \qquad (12)$$

$$int\_max = 100 \ mS \qquad (13)$$

$$intx0 = 80 \ ms \qquad (14)$$

$$intn0 = 10 \ mS \qquad (15)$$

$$intx1 = 40 \ mS \qquad (16)$$

$$intn1 = 5 \ mS \qquad (17)$$

$$VL = 4 \qquad (18)$$

The subroutine of FIG. 8 is called and executed when step S1403 of FIG. 16 is executed. The subroutine of FIG. 9 is called and executed when the step S1404 of FIG. 16 is executed.

Figure 17:
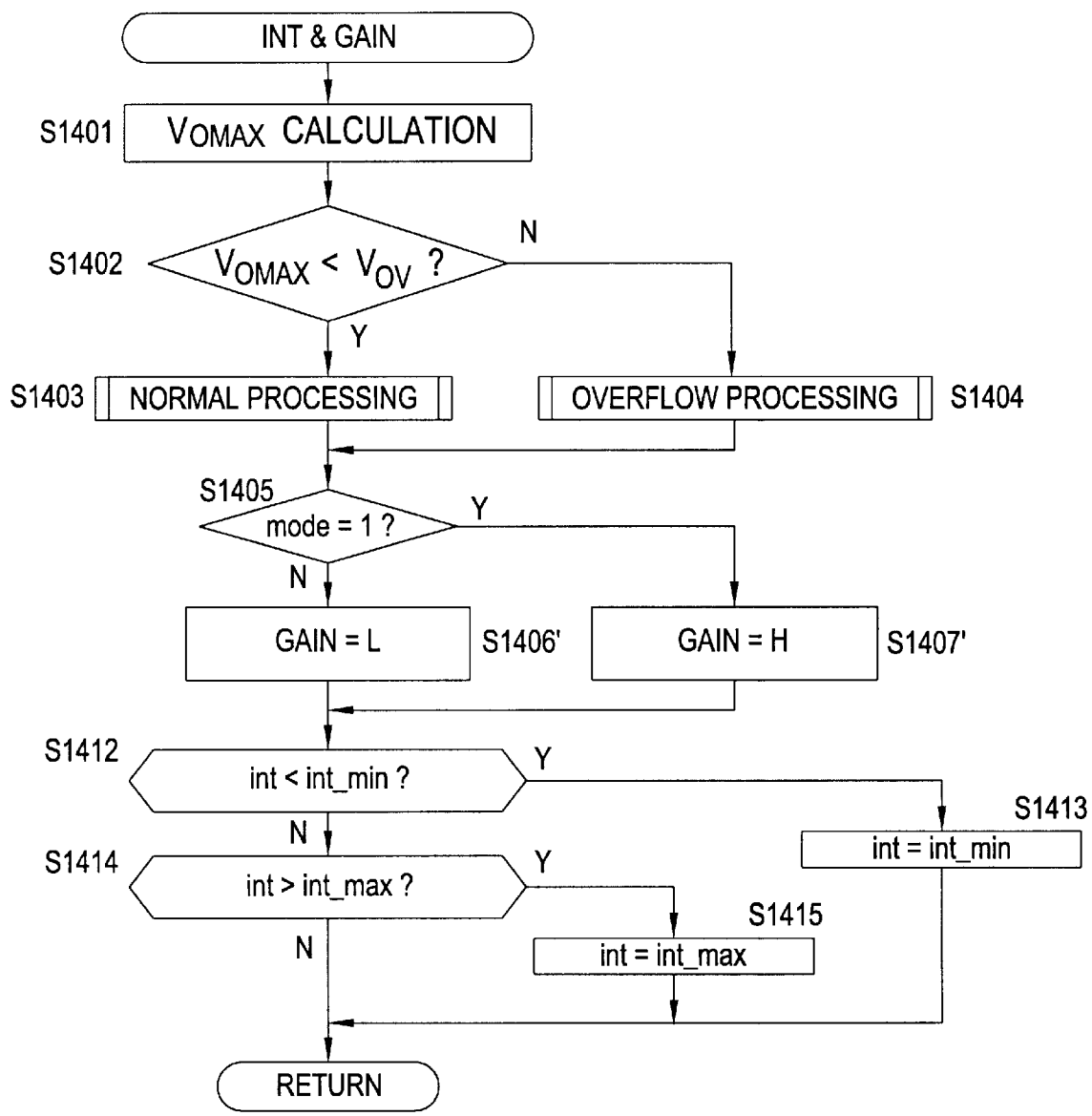
FIG. 17 is a flow chart of a routine that sets the accumulation time and amp gain for a subsequent round of photometry in a camera according to a third embodiment of the invention.

FIG. 17 is a flow chart of a subroutine that determines the amp gain and accumulation time according to a third embodiment of the present invention. The same symbols are used in each of the embodiments described below for components (or steps) in which the same function is achieved as in the second embodiment described above.

Although in the second embodiment, the values of parameters such as int_L_max and int_H_min are used to determine whether to switch the gain of the photometry circuit 10, the gain is switched directly in the third embodiment. That is, it is determined whether mode=1 in step S1405 in FIG. 17, in other words, whether the film feed mode is the high speed continuous feed mode (CH). When the mode=0, the film feed mode was not the high speed continuous feed mode (CH), that is, it was the single feed mode (S) or the low speed continuous feed mode (CL), and flow proceeds to step S1406' where the gain is set to L. Meanwhile, when the mode=1, that is, the film feed mode was the high speed continuous feed mode (CH), flow proceeds to step S1407' where the gain is set to H.

In this case, steps S1408, S1409, S1410 and S1411 are unnecessary because the gain setting for the CCD has already been completed in steps S1405, S1406' and S1407'. Because processing of the routine in the third embodiment is simple compared to the second embodiment, the control speed becomes higher, which is an advantage.

Figure 18:
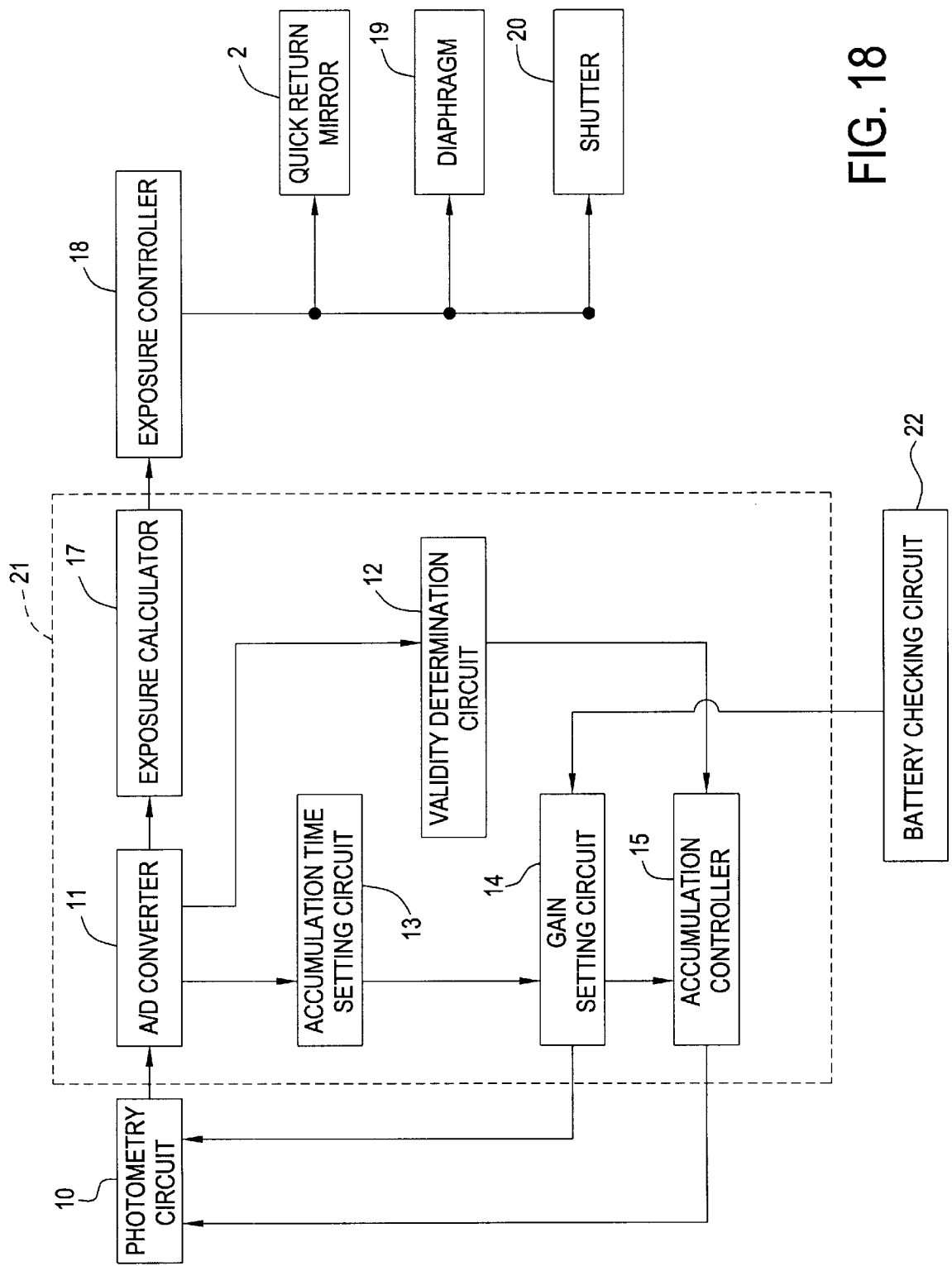
FIG. 18 is a block diagram of a camera equipped with a photometry device according to a fourth embodiment of the present invention.
Figure 19:
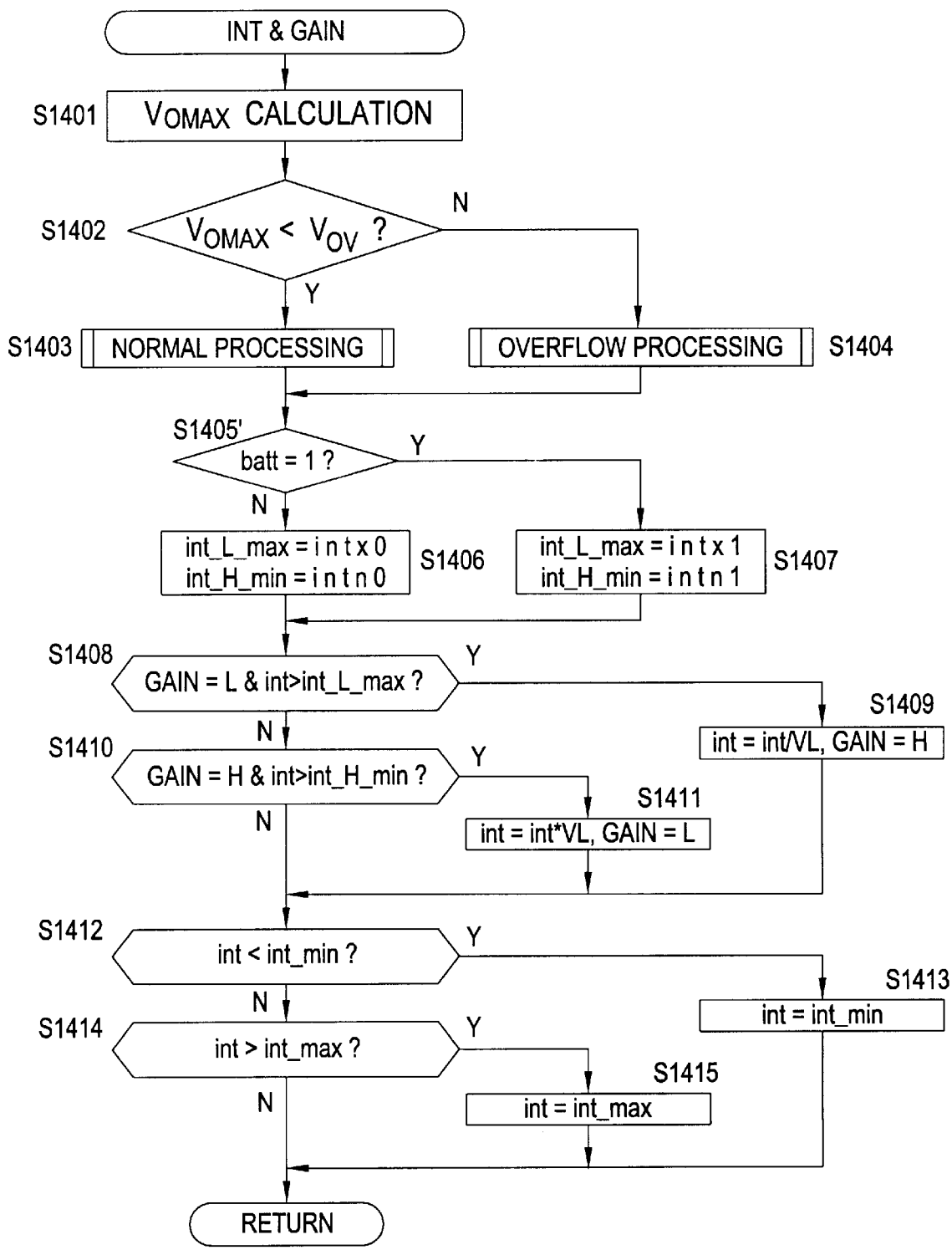
FIG. 19 is a flow chart of a routine that establishes the accumulation time and amp gain for a subsequent round of photometry according to the fourth embodiment of the invention.

FIG. 18 is a block diagram showing a fourth embodiment of a camera photometry device according to the present invention. FIG. 19 is a flow chart showing a subroutine for determining the accumulation time and the amp gain for the next round of photometry according to this fourth embodiment.

The fourth embodiment includes a battery checking circuit 22 that determines the status of the battery. When the battery has sufficient charge, circuit 22 maintains a battery flag (batt) at a value of 1 (batt=1). When the battery does not store sufficient charge, circuit 22 sets the flag batt to a value of 0 (batt=0) In the fourth embodiment, the control routine of FIG. 16 is modified as shown in FIG. 19 by replacing step S1405 with step S1405'. In step S1405', it is determined whether batt=1. When batt=1, i.e., when the remaining battery capacity is sufficient, flow proceeds to step S1407. When the remaining battery capacity is insufficient, flow proceeds to step S1406. The remaining steps are similar to those in FIG. 16.

It is possible with the fourth embodiment to supplement the photometry time when the remaining capacity of the battery is low and the film feed speed has become slow. As a result, the accumulation time of the photometry element is made longer, so that it is possible to improve photometry accuracy over the situation in which the accumulation time is short.

The present invention is not limited to what has been described above. Various modifications and/or alternatives are possible and within the scope of the present invention.

For example, although the photometry circuit was described with an example in which it has a first mode in which the accumulation time is long and a second mode in which the accumulation time is short as compared to the first mode, it is also possible in the same way to have a first mode in which the accumulation speed (rate) is slow, and a second mode in which the accumulation speed (rate) is fast as compared to the first mode. Further, the feed mode setting device may also identify the selected mode. Accordingly, the preferred embodiments of the invention as set forth herein are intended to be illustrative, not limiting. Various changes may be made without departing from the spirit and scope of the invention as defined in the following claims.

What is claimed is:

1. A photometry device comprising:
    a photometry circuit that performs photometry on an object field using a photometry element that accumulates charge with the passage of time;
    a prohibit signal generator that generates a photometry prohibiting signal that prohibits the photometry element from accumulating charge; and
    a parameter determining circuit that determines at least one photometry parameter that is to be used by the photometry element to perform photometry, the parameter determining circuit determining the at least one parameter based on an output of the photometry circuit during a prior round of photometry and on the photometry prohibiting signal generated by the prohibit signal generator.

2. The device of claim 1, further comprising:
    an accumulation time setting circuit that sets an accumulation time to be used by the photometry element during a next round of photometry based on the output of the photometry circuit during the prior round of photometry; and
    an accumulation controller that controls the starting and stopping of the accumulation by the photometry element; wherein:
        the parameter determining circuit determines the at least one parameter based on an output of the accumulation time setting circuit during the prior round of photometry and on the photometry prohibiting signal generated by the prohibit signal generator.

3. The device of claim 1, wherein the at least one parameter includes a gain to be used by the photometry element.

4. The device of claim 3, wherein the at least one parameter also includes the accumulation time to be used by the photometry element.

5. The device of claim 1, wherein the at least one parameter includes the accumulation time to be used by the photometry element.

6. The device of claim 2, wherein the parameter determining circuit changes the value of the at least one photometry parameter when accumulation during the prior round of photometry was interrupted by the photometry prohibiting signal, as compared to the value of the at least one photometry parameter when the accumulation during the prior round of photometry was not interrupted by the photometry prohibiting signal.

7. The device of claim 2, wherein the parameter determining circuit changes the value of the at least one photometry parameter when accumulation during the prior round of photometry was interrupted by the photometry prohibiting signal, as compared to the value of the at least one photometry parameter when the accumulation during the prior round of photometry was not interrupted by the photometry prohibiting signal, only during a first round of photometry that occurs after the photometry prohibiting signal stops being generated.

8. The device of claim 2, wherein:
    the photometry circuit has a first mode in which the accumulation time for photometry is long, and a second mode in which the accumulation time for photometry is short in comparison with the first mode; and
    the parameter determining circuit selects between the first mode and the second mode based on the output of the accumulation time setting circuit and the prohibit signal generator.

9. The device of claim 8, wherein the parameter determining circuit selects the second mode for use during the next round of accumulation when the accumulation during the prior round of accumulation was interrupted due to the photometry prohibiting signal generated by the prohibit signal generator.

10. The device of claim 8, wherein the photometry circuit can switch an output gain at least between a high state and a low state, and the first mode is the low gain state, and the second mode is the high gain state.

11. The device of claim 8, wherein the parameter determining circuit selects, as the at least one photometry parameter, the second mode for use during the next round of photometry when the first mode was used during the prior round of photometry and the length of the accumulation time set by the accumulation time setting circuit for use during the next round of photometry is longer than a first value, and the parameter determining circuit selects the first mode for use during the next round of photometry when the second mode was used during the prior round of photometry and the length of the accumulation time set by the accumulation time setting circuit for use during the next round is shorter than a second value that is different from the first value.

12. The device of claim 11, wherein the parameter determining circuit changes the first value to a third value when the accumulation performed during the prior round of photometry was interrupted due to generation of the photometry prohibiting signal by the prohibit signal generator.

13. The device of claim 11, wherein the parameter determining circuit changes the second value to a fourth value when accumulation performed during the prior round of photometry was interrupted due to generation of the photometry prohibiting signal by the prohibit signal generator.

14. The device of claim 12, wherein the parameter determining circuit changes the first value to the third value only during the first round of photometry that occurs after the photometry prohibiting signal has stopped being output after the accumulation performed during the prior round of photometry was interrupted due to generation of the photometry prohibiting signal by the prohibit signal generator.

15. The device of claim 13, wherein the parameter determining circuit changes the second value to the fourth value only during the first round of photometry that occurs after the photometry prohibiting signal has stopped being output after the accumulation performed during the prior round of photometry was interrupted due to generation of the photometry prohibiting signal by the prohibit signal generator.

16. The device of claim 1, in combination with a single reflex camera that includes a quick return mirror, wherein the prohibit signal generator generates the photometry prohibiting signal in synchronization with operation of the quick return mirror.

17. The device of claim 1, wherein the prohibit signal generator and the parameter determining circuit are defined by a programmed microcomputer.

18. A photometry device comprising:

photometry means for performing photometry on an object field based on an amount of charge that is accumulated due to exposure by light from the object field with the passage of time;

prohibiting means for generating a photometry prohibiting signal that prohibits the photometry means from accumulating charge; and parameter determining means for determining at least one photometry parameter that is to be used by the photometry means to perform photometry, the parameter determining means determining the at least one parameter based on an output of the photometry means during a prior round of photometry and on the photometry prohibiting signal generated by the prohibiting means.

19. The device of claim 18, further comprising:

time setting means for setting an accumulation time to be used by the photometry means during a next round of photometry based on the output of the photometry means during the prior round of photometry; and photometry control means for controlling the starting and stopping of the accumulation by the photometry means; wherein:

the parameter determining means determines the at least one parameter based on an output of the time setting means during the prior round of photometry and on the photometry prohibiting signal generated by the prohibiting means.

20. A method of controlling photometry, comprising the steps of:

performing photometry on an object field using a photometry element that accumulates charge with the passage of time;

monitoring whether a prohibit signal, which prohibits the photometry element from accumulating charge, is generated during the performance of the photometry; and determining at least one photometry parameter that is to be used by the photometry element to perform a subsequent round of photometry based on an output of the photometry circuit and based on whether the photometry prohibiting signal was generated during the performance of the photometry.

21. The method of claim 20, wherein the determining step includes determining the at least one photometry parameter that is to be used by the photometry element to perform a subsequent round of photometry based on the output of the photometry circuit, and then changing the at least one photometry parameter when the photometry prohibiting signal was generated during the performance of the photometry.

22. A photometry device comprising:

photometry means for performing photometry on an object field by accumulating charge;

accumulation control means for controlling the start and finish of the accumulation of charge performed by the photometry means;

feed mode setting means for setting a film feed mode from among at least a high-speed mode in which a photographic interval between photographs is short and a low-speed mode in which the photographic interval between photographs is long; and photometry parameter determining means for determining photometry parameters to be used by the accumulation control means based on an output of the feed mode setting means.

23. The device of claim 22, wherein:

the photometry means is operable in a first mode in which the accumulation time for photometry is long, and in a second mode in which the accumulation time is short as compared to the accumulation time for the first mode; and the photometry parameter determining means selects between the first mode and the second mode based on signals output by the accumulation control means and the feed mode setting means.

24. The device of claim 22, wherein:

the photometry means is operable in a first mode in which the accumulation speed for photometry is slow, and in a second mode in which the accumulation speed is fast as compared to the accumulation speed for the first mode; and the photometry parameter determining means selects between the first mode and the second mode based on signals output by the accumulation control means and the feed mode setting means.

25. The device of claim 23, wherein:

the photometry means can be switched between a high output gain and a low output gain; the first mode being the low output gain and the second mode being the high output gain.

26. The device of claim 24, wherein:

the photometry means can be switched between a high output gain and a low output gain; the first mode being the low output gain and the second mode being the high output gain.

27. The device of claim 23, wherein:

the photometry parameter determining means selects the second mode for use during the next round of photometry when the first mode was used during the prior round of photometry and the length of the accumulation time set for the next round of photometry is longer than a first value; and the photometry parameter determining means selects the first mode for use during the next round of photometry when the second mode was used during the prior round of photometry and the length of the accumulation time set for the next round of photometry is shorter than a second value that is different from the first value.

28. The device of claim 27, wherein:

the photometry parameter determining means changes the first value to a third value when the setting of the feed mode setting means is in the high-speed mode.

29. The device of claim 27, wherein:

the photometry parameter determining means changes the second value to a fourth value when the setting of the feed mode setting means is in the high-speed mode.

30. The device of claim 28, wherein the third value is equal to or less than a smallest mirror-down time of a quick return mirror of a single-reflex camera incorporating the photometry device.

31. The device of claim 29, wherein the fourth value is equal to or less than a smallest mirror-down time of a quick return mirror of a single-reflex camera incorporating the photometry device.

32. A photometry device comprising:

a photometry element that performs photometry on an object field by accumulating charge;

an accumulation controller that controls the start and finish of the accumulation of charge performed by the photometry element;

a feed mode setting switch by which a film feed mode is set from among at least a high-speed mode in which a photographic interval between photographs is short and a low-speed mode in which the photographic interval between photographs is long;

the accumulation controller determining photometry parameters to be used to control the accumulation based on an output of the feed mode setting switch.

33. The device of claim 32, wherein:

the photometry element is operable in a first mode in which the accumulation time for photometry is long, and in a second mode in which the accumulation time is short as compared to the accumulation time for the first mode; and the accumulation controller selects between the first mode and the second mode based on signals output by the feed mode setting switch.

34. The device of claim 32, wherein:

the photometry element is operable in a first mode in which the accumulation speed for photometry is slow, and in a second mode in which the accumulation speed is fast as compared to the accumulation speed for the first mode; and the accumulation controller selects between the first mode and the second mode based on signals output by the feed mode setting switch.

35. The device of claim 33, wherein:

the accumulation controller selects the second mode for use during the next round of photometry when the first mode was used during the prior round of photometry and the length of the accumulation time set for the next round of photometry is longer than a first value; and the accumulation controller selects the first mode for use during the next round of photometry when the second mode was used during the prior round of photometry and the length of the accumulation time set for the next round of photometry is shorter than a second value that is different from the first value.

36. The device of claim 35, wherein:

the accumulation controller changes the first value to a third value when the setting of the feed mode setting switch is in the high-speed mode.

37. The device of claim 35, wherein:

the accumulation controller changes the second value to a fourth value when the setting of the feed mode setting switch is in the high-speed mode.

38. The device of claim 36, wherein the third value is equal to or less than a smallest mirror-down time of a quick return mirror of a single-reflex camera incorporating the photometry device.

39. The device of claim 37, wherein the fourth value is equal to or less than a smallest mirror-down time of a quick return mirror of a single-reflex camera incorporating the photometry device.

40. A photometry method used with a photometry element that performs photometry on an object field by accumulating charge, the method comprising the steps of:

receiving a feed mode setting from among at least a high-speed mode setting in which a photographic interval between photographs is short and a low-speed mode setting in which the photographic interval between photographs is long; and controlling the start and finish of the accumulation of charge performed by the photometry element using photometry parameters that are determined based on the feed mode setting.

41. The method of claim 40, wherein:

the photometry element is operable in a first mode in which the accumulation time for photometry is long, and in a second mode in which the accumulation time is short as compared to the accumulation time for the first mode; and the controlling step includes selecting between the first mode and the second mode based on the feed mode setting.

42. The method of claim 40, wherein:

the photometry element is operable in a first mode in which the accumulation speed for photometry is slow, and in a second mode in which the accumulation speed is fast as compared to the accumulation speed for the first mode; and the controlling step includes selecting between the first mode and the second mode based on the feed mode setting.

43. The method of claim 41, wherein:

the controlling step includes selecting the second mode for use during the next round of photometry when the first mode was used during the prior round of photometry and the length of the accumulation time set for the next round of photometry is longer than a first value; and the controlling step also includes selecting the first mode for use during the next round of photometry when the second mode was used during the prior round of photometry and the length of the accumulation time set for the next round of photometry is shorter than a second value that is different from the first value.

44. The method of claim 43, wherein the controlling step changes the first value to a third value when the feed mode setting is the high-speed mode.

45. The method of claim 43, wherein the controlling step changes the second value to a fourth value when the feed mode setting is the high-speed mode.

46. A photometry device comprising:

photometry means for performing photometry on an object field by accumulating charge;

accumulation control means for controlling the start and finish of the accumulation of charge by the photometry means;

status detecting means for detecting the status of a power source; and photometry parameter determining means for determining photometry parameters to be used by the accumulation control means based on an output of the status detecting means.

47. The device of claim 46, wherein:

the photometry means is operable in a first mode in which the accumulation time for photometry is long, and in a second mode in which the accumulation time is short as compared to the accumulation time for the first mode; and the photometry parameter determining means selects between the first mode and the second mode based on signals output by the accumulation control means and the status detecting means.

48. The device of claim 46, wherein:

the photometry means is operable in a first mode in which the accumulation speed for photometry is slow, and in a second mode in which the accumulation speed is fast as compared to the accumulation speed for the first mode; and the photometry parameter determining means selects between the first mode and the second mode based on signals output by the accumulation control means and the status detecting means.

49. The device of claim 47, wherein:

the photometry means can be switched between a high output gain and a low output gain; the first mode being the low output gain and the second mode being the high output gain.

50. The device of claim 48, wherein:

the photometry means can be switched between a high output gain and a low output gain; the first mode being the low output gain and the second mode being the high output gain.

51. The device of claim 47, wherein:

the photometry parameter determining means selects the second mode for use during the next round of photometry when the first mode was used during the prior round of photometry and the power source voltage is higher than a first value; and the photometry parameter determining means selects the first mode for use during the next round of photometry when the second mode was used during the prior round of photometry and the power source voltage is lower than a second value that is different from the first value.

52. A photometry device comprising:

a photometry element that performs photometry on an object field by accumulating charge;

an accumulation controller that controls the start and finish of the accumulation of charge performed by the photometry element;

a status detector that detects the status of a power source;

the accumulation controller determining photometry parameters to be used to control the accumulation based on an output of the status detector.

53. The device of claim 52, wherein:

the photometry element is operable in a first mode in which the accumulation time for photometry is long, and in a second mode in which the accumulation time is short as compared to the accumulation time for the first mode; and the accumulation controller selects between the first mode and the second mode based on signals output by the status detector.

54. The device of claim 52, wherein:

the photometry element is operable in a first mode in which the accumulation speed for photometry is slow, and in a second mode in which the accumulation speed is fast as compared to the accumulation speed for the first mode; and the accumulation controller selects between the first mode and the second mode based on signals output by the status detector.

55. The device of claim 53, wherein:

the accumulation controller selects the second mode for use during the next round of photometry when the first mode was used during the prior round of photometry and the power source voltage is higher than a first value; and the accumulation controller selects the first mode for use during the next round of photometry when the second mode was used during the prior round of photometry and the power source voltage is lower than a second value that is different from the first value.

56. A photometry method used with a photometry element that performs photometry on an object field by accumulating charge, the method comprising the steps of:

receiving a status of a power source; and controlling the start and finish of the accumulation of charge performed by the photometry element using photometry parameters that are determined based on the received status.

57. The method of claim 56, wherein:

the photometry element is operable in a first mode in which the accumulation time for photometry is long, and in a second mode in which the accumulation time is short as compared to the accumulation time for the first mode; and the controlling step includes selecting between the first mode and the second mode based on the received status.

58. The method of claim 56, wherein:

the photometry element is operable in a first mode in which the accumulation speed for photometry is slow, and in a second mode in which the accumulation speed is fast as compared to the accumulation speed for the first mode; and the controlling step includes selecting between the first mode and the second mode based on the received status.

59. The method of claim 57, wherein:

the controlling step includes selecting the second mode for use during the next round of photometry when the first mode was used during the prior round of photometry and the power source voltage is higher than a first value; and the controlling step also includes selecting the first mode for use during the next round of photometry when the second mode was used during the prior round of photometry and the power source voltage is lower than a second value that is different from the first value.

* * * * *